United States Patent [19]

Kaneko et al.

[11] Patent Number: 5,087,119
[45] Date of Patent: Feb. 11, 1992

[54] DISTANCE MEASURING APPARATUS

[75] Inventors: Yoshiyuki Kaneko, Kawasaki; Ryoichi Suzuki, Yokohama, both of Japan

[73] Assignee: Canon Kabushiki Kaisha, Tokyo, Japan

[21] Appl. No.: 483,293

[22] Filed: Feb. 20, 1990

Related U.S. Application Data

[63] Continuation of Ser. No. 382,041, Jul. 18, 1989, abandoned, which is a continuation-in-part of Ser. No. 300,220, Jan. 24, 1989, abandoned, which is a continuation of Ser. No. 19,790, Feb. 27, 1987, abandoned.

[30] Foreign Application Priority Data

Feb. 28, 1986 [JP] Japan .................. 61-044551
Jan. 23, 1987 [JP] Japan .................. 62-013470

[51] Int. Cl.⁵ .................. G01C 3/00; G01C 5/00; G03B 3/00
[52] U.S. Cl. .................. 356/1; 354/403; 250/201.6
[58] Field of Search .................. 356/1, 4; 354/403; 250/201.6

[56] References Cited

U.S. PATENT DOCUMENTS

| | | | |
|---|---|---|---|
| 3,759,614 | 9/1973 | Harvey | 356/4 |
| 4,389,106 | 6/1983 | Maruyama | 354/403 |
| 4,435,058 | 3/1984 | Yoshida et al. | 354/403 |
| 4,470,681 | 9/1984 | Johnson | 354/403 |
| 4,571,048 | 2/1986 | Sugawara | 354/403 |
| 4,582,424 | 4/1986 | Kawabata | 356/1 |
| 4,618,235 | 10/1986 | Ishida et al. | 354/403 |
| 4,623,237 | 11/1986 | Kaneda et al. | 354/403 |
| 4,637,705 | 1/1987 | Kawabata | 354/403 |
| 4,688,919 | 8/1987 | Ogawa et al. | 354/403 |
| 4,693,597 | 9/1987 | Shiomi et al. | 356/1 |
| 4,758,082 | 7/1988 | Kozuki et al. | 356/1 |
| 4,954,861 | 9/1990 | Nagaoka et al. | 354/403 |
| 4,983,033 | 1/1991 | Suzuki | 356/4 |

FOREIGN PATENT DOCUMENTS 0144711 7/1985 Japan .................. 354/403

Primary Examiner—Stephen C. Buczinski
Attorney, Agent, or Firm—Fitzpatrick, Cella, Harper & Scinto

[57] ABSTRACT

Disclosed is a distance measuring apparatus for projecting a signal and measuring a distance up to an object according to a reception position of a signal reflected by the object, the apparatus being arranged such that a ratio of a plurality of outputs from a receiver for receiving the reflected signal is changed according to the reception position of the reflected signal, the change state is detected by ascending and descending integrations of the plurality of outputs, and the reception position of the reflected signal is detected, comprising: projecting means for projecting the signal; timer means for counting a predetermined period of time within a period required for the ascending integration; detecting means for detecting whether an amplitude of the reflected signal received by the receiving means has reached a predetermined level within the predetermined period of time counted by the timer means; and switching means for causing the projecting means to project the signal onto one of central and peripheral areas within a field of view and the signal to the other one of the central and peripheral areas to measure a distance for the other one of the areas when the amplitude of the reflected signal does not reach the predetermined level within the predetermined period of time, thereby accurately measuring a distance to the object within a short period of time regardless of the position of the object and with only a compact arrangement.

60 Claims, 11 Drawing Sheets

DISTANCE MEASURING APPARATUS

This application is a continuation of application Ser. No. 382,041, filed Jul. 18, 1989, which was a continuation of Ser. No. 300,220, filed Jan. 24, 1989, which is a continuation of Ser. No. 019,790, filed Feb. 27, 1989, all three now abandoned.

BACKGROUND OF THE INVENTION

1. Field of the Invention

The present invention relates to a distance measuring apparatus used in photographing equipment such as cameras and, more particularly, to a new and improved distance measuring apparatus capable of measuring a distance to an object present within a measurable range at high speed in a short period of time even if the object is not located at the center of the photographing field of view.

2. Related Background Art

In recent years, cameras incorporate automatic focusing systems. An active infrared distance measuring apparatus employing the principle of trigonometric measurement is known as a major component of the automatic focusing system.

A conventional infrared distance measuring apparatus comprises a light-emitting element such as an infrared light-emitting diode and a light-receiving element for receiving an infrared beam emitted from the diode and reflected by an object and for outputting an electrical signal. The conventional infrared distance measuring apparatus can perform distance measurement with relatively high precision and is compact. From these advantages, the infrared light measuring apparatus is used as a distance measuring apparatus suitable for a camera.

In a conventional distance measuring apparatus incorporated in a camera, a beam from the light-emitting element is designed to be projected onto only the central area of the photographing field of view. For example, if a user uses the camera incorporating the conventional distance measuring apparatus to take a picture of two persons standing having the center of the photographing field of view between them, the beam emitted from the light-emitting element is projected on a distant position (i.e., infinite position whose distance from the camera is not measurable) of the background. As a result, the two persons as objects to be photographed are not kept in the just-in-focus state and are thus out of focus since no object is present at the center of the field of view.

In order to eliminate the above disadvantage, distance measurement is performed after the central position in the photographing field of view is aligned with an object to be photographed. The user then determines framing and takes a picture of this object. However, this photographing technique is very difficult for a user who does not satisfactorily understand the automatic focus control mechanism. In addition, the photographing technique is time-consuming and cumbersome.

In order to solve the above problem, a distance measuring apparatus employing a wide field of view is proposed wherein the photographing field of view is divided into a plurality of areas and distance measurement data values from these areas are evaluated to determine focusing of the camera.

There are two types of distance measuring apparatuses employing the wide field of view. These apparatuses have the following disadvantages. According to the first type of apparatus disclosed in Japanese Patent Disclosure (Kokai) No. 143914/1984, a plurality of light-emitting elements for respectively emitting beams onto a plurality of areas within the photographing field of view are time-divisionally driven, and output signals from light-receiving elements are time-divisionally processed to calculate distance measurement values of the respective light emission points. A proper distance measurement value is output after the measurement values are processed according to a predetermined algorithm. According to the first type of apparatus, an accurate distance measurement value can be obtained. However, the circuit arrangement of the apparatus is bulky and high-cost and requires a long processing time, as compared with other conventional distance measurement apparatuses. Therefore, a long period of time is required from the beginning of distance measurement to the end of photographing.

According to the second type of apparatus as described in Japanese Patent Application No. 152297/1985, the following distance measurement operation is performed. In this distance measuring apparatus, distance measurement is performed for one of the central and peripheral areas within the photographing field of view. If the measured value of the measured area is an infinite valve, precise distance measurement is performed for the other one of the central and peripheral areas. If the measured value is a finite value, this value is output as the distance measurement value.

The second type of distance measurement apparatus is smaller than the first type but requires two distance measurements. In this sense, the distance measurement time is doubled as compared with the conventional distance measuring apparatus and cannot be conveniently used in practice. The disadvantage of this apparatus is decisive in a distance measuring apparatus employing a double integrator as a signal processor. In the distance measuring apparatus of this type, a long signal processing time is required to perform double integration.

SUMMARY OF THE INVENTION

It is an object of the present invention to eliminate the above conventional drawbacks in distance measuring apparatuses employing a wide field of view. In order to achieve the above object of the present invention, there is provided a distance measuring apparatus for projecting a signal and measuring a distance up to an object according to a reception position of a signal reflected by the object, the apparatus being arranged such that a ratio of a plurality of outputs from a receiver for receiving the reflected signal is changed according to the reception position of the reflected signal, the change state is detected by ascending and descending integrations of the plurality of outputs, and the reception position of the reflected signal is detected, comprising: projecting means for projecting the signal; timer means for counting a predetermined period of time within a period required for the ascending integration; detecting means for detecting whether an amplitude of the reflected signal received by the receiving means has reached a predetermined level within the predetermined period of time counted by the timer means; and switching means for causing the projecting means to project the signal onto one of central and peripheral areas within a field of view and the signal to the other one of the central and peripheral areas to measure a distance for the other one of the areas when the amplitude of the reflected signal does not reach the predetermined level within the predetermined period of time, thereby accurately measuring a distance to the object within a short period of time regardless of the position of the object and with only a compact arrangement.

The above and other objects, features, and advantages of the present invention will be apparent from the detailed description of preferred embodiments in conjunction with the accompanying drawings.

DETAILED DESCRIPTION OF THE PREFERRED EMBODIMENTS

Preferred embodiments of the present invention will be described with reference to the accompanying drawings.

Figure 1:
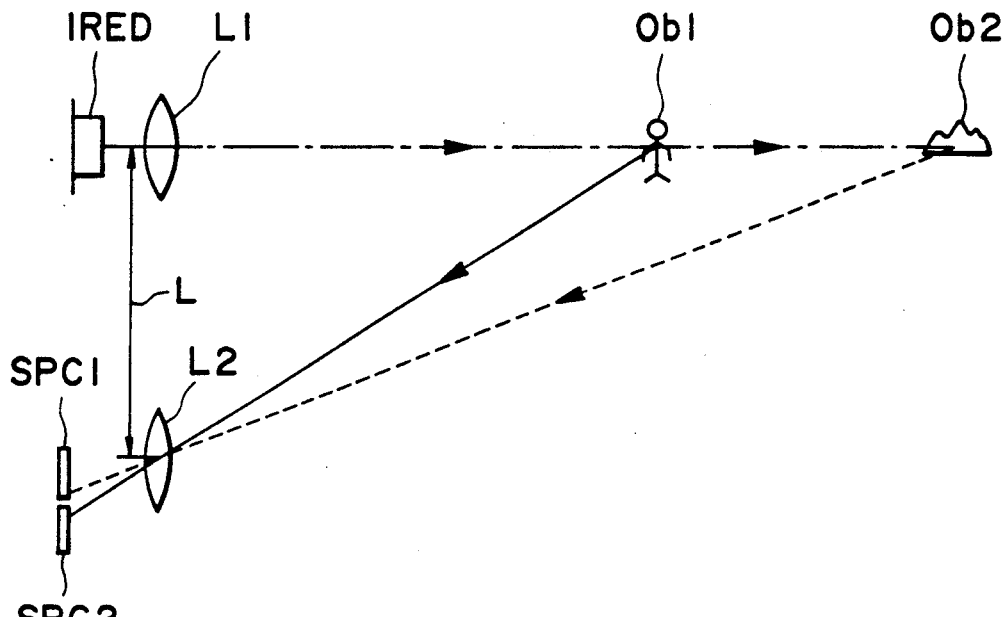
FIG. 1 is a schematic view showing the principle of a distance measuring apparatus according to the present invention.
Figure 2:
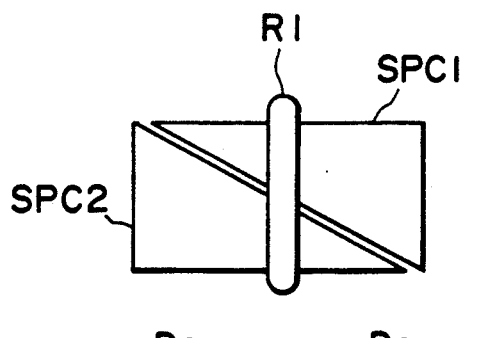
FIG. 2 is a view showing a structure of a light-receiving element in a light-receiving section.

FIG. 1 is a schematic view for explaining the principle of a distance measuring apparatus according to the present invention, and FIG. 2 is a plan view showing a light-receiving element shown in FIG. 1.

Referring to FIGS. 1 and 2, a light-emitting element IRED emits linear infrared beams onto objects Ob1 and Ob2 through a projection lens L1. A light-receiving lens L2 serves to focus beams reflected by the objects Ob1 and Ob2 subjected to distance measurement onto light-receiving elements SPC1 and SPC2 spaced apart from each other by a predetermined distance 1 (to be called as a base line length hereinafter) with respect to the optical path of the beam from the light-emitting element IRED. An image RI formed by beams reflected by the objects focused on the light-receiving elements SPC1 and SPC2 is continuously moved along a direction 11 (to be referred to as a base line length direction hereinafter) perpendicular to the light emission axis. In other words, the farther a distance to the object, the closer the image RI is moved toward the light-receiving element SPC1. Each of the light-receiving elements SPC1 and SPC2 has a wedge-like shape, as shown in FIG. 2. Outputs from the light-receiving elements SPC1 and SPC2 are changed according to a distance between the objects to be measured. If an output from one of the light-receiving elements is increased, an output from the other is decreased. If the outputs from the light-receiving elements SPC1 and SPC2 are defined as A and B, respectively, a signal $A/(A+B)$ normalized by the value $(A+B)$ represents an object position. A displacement (an extending amount of the lens) of the photographing lens is controlled by an output from the distance measuring apparatus, thus achieving an automatic focusing system.

Figure 3:
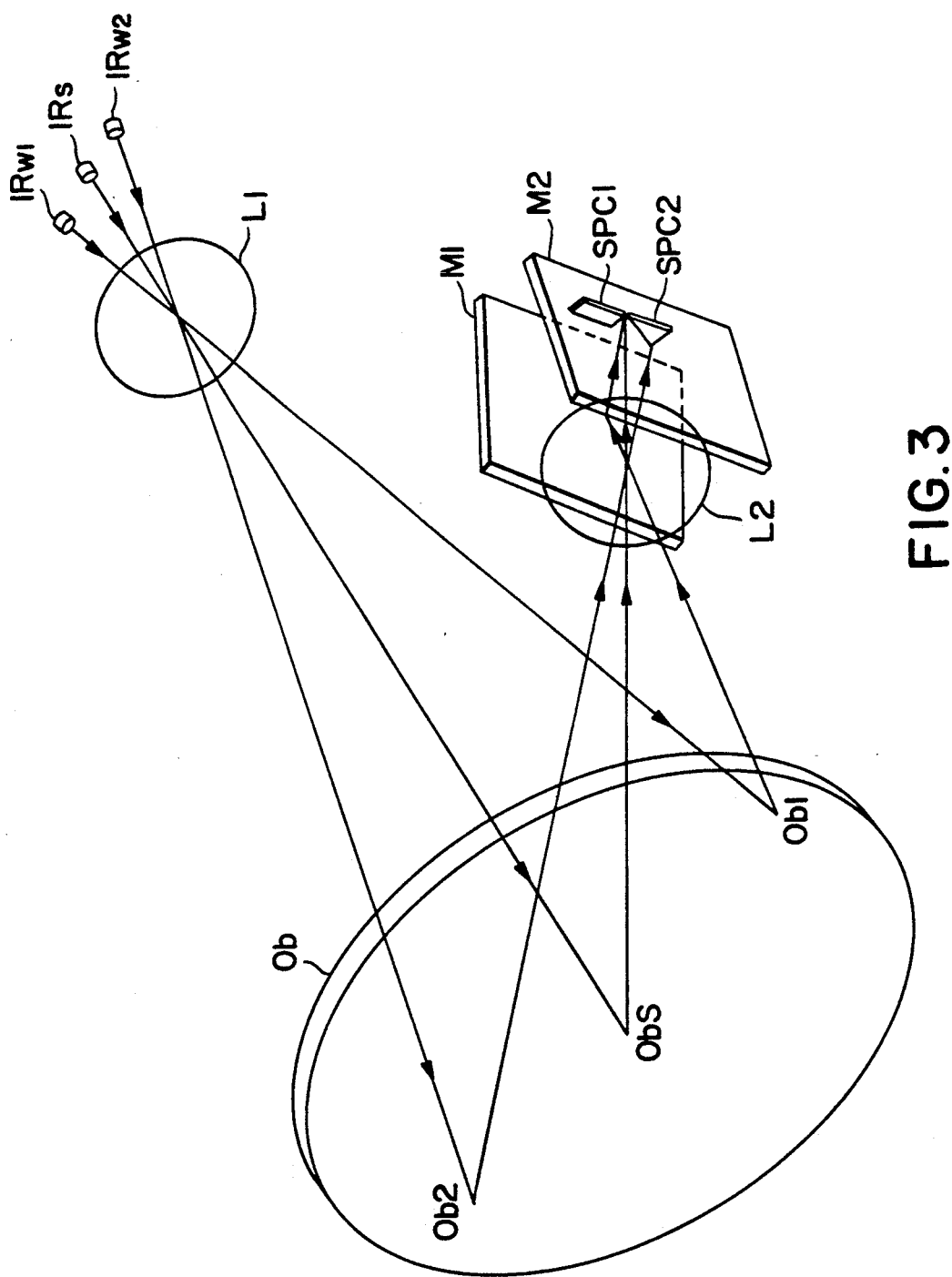
FIG. 3 is a schematic view showing a distance measuring apparatus according the present invention.

FIG. 3 is a schematic view of a distance measuring apparatus applied to the present invention. Referring to FIG. 3, a light-emitting element IRs emits a beam onto a central portion Obs on a reflecting surface Ob of an object through a projection lens L1. Light-emitting elements IRw1 and IRw2 emit beams onto peripheral portions Ob1 and Ob2 on the reflecting surface Ob of the object, respectively. When beams reflected by the central and peripheral portions Obs, Ob1, and Ob2 of the reflecting surface are incident on the light-receiving elements SPC1 and SPC2 through the light-receiving lens L2, the beams reflected by the portions Ob1 and Ob2 are received by the light-receiving elements by way of reflecting mirrors M1 and M2 in one-to-one correspondence of the distance and the light-receiving position regardless of the reflected portions.

A control circuit employing the arrangement shown in FIG. 3 will be described with reference to FIG. 4.

Figure 4:
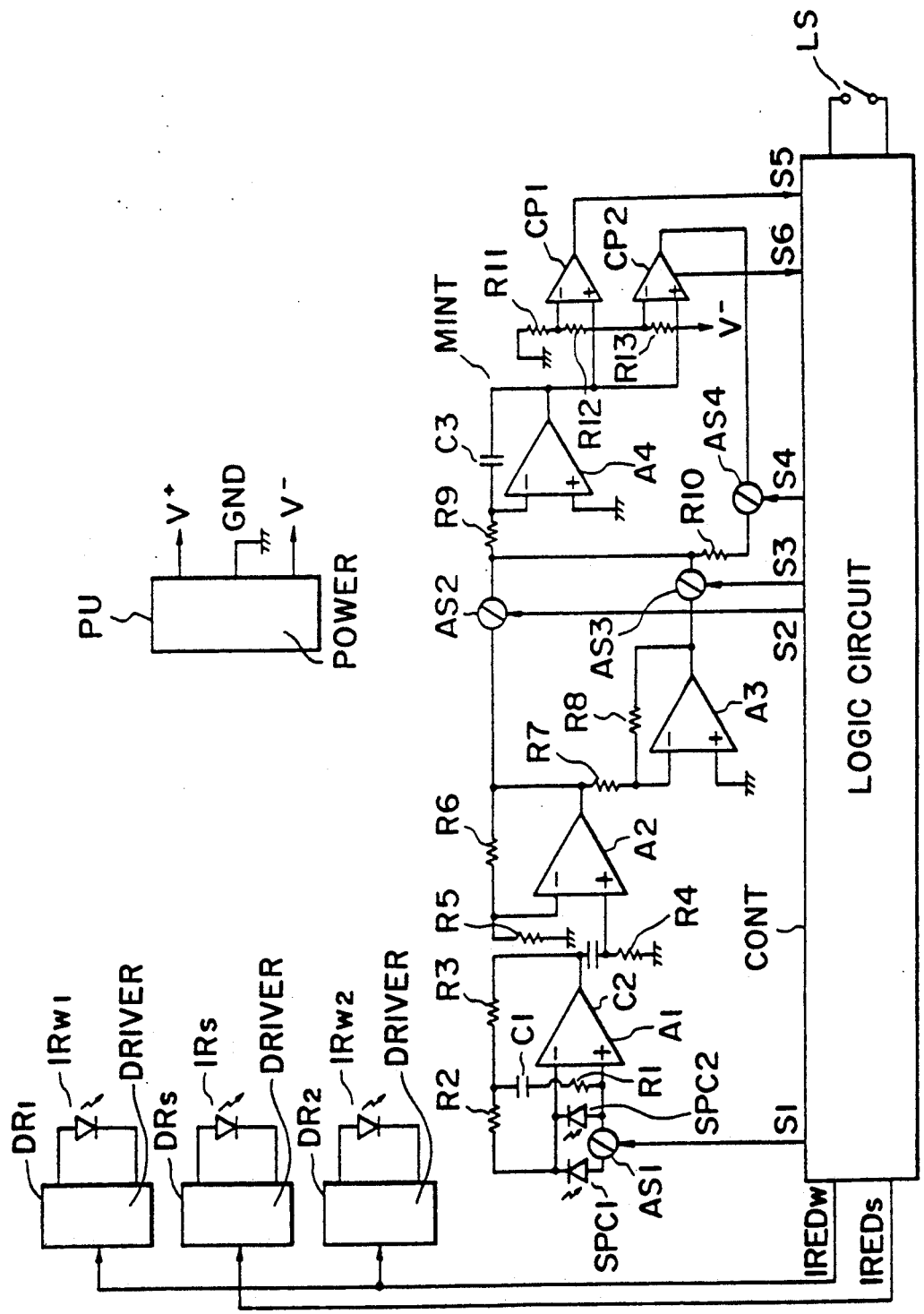
FIG. 4 is a circuit diagram showing an embodiment of the distance measuring apparatus according to the present invention.

Referring to FIG. 4, the control circuit includes a power source circuit PU, a logic circuit CONT comprising a microcomputer and the like for controlling signals, a light-emitting element IRs for emitting a beam onto the central portion of the object within the photographing field of view, light-emitting elements IRw1 and IRw2 for emitting beams onto peripheral portions within the field of view, and light-emitting element drivers DRs, DR1, and DR2 for driving the corresponding light-emitting elements. The drivers DRs, DR1, and DR2 are controlled by signals IREDs and IREDw generated by the logic circuit CONT. The control circuit also includes a camera release button Ls, light-receiving elements SPC1 and SPC2 shown in FIGS. 1 to 3, and an amplifier A1 of a high input impedance for converting output currents from the light-receiving elements SPC1 and SPC2 into corresponding voltages. The amplifier A1 and a negative feedback circuit constitutes a filter having a DC clamping function. In this case, the negative feedback circuit comprises resistors R1, R2, R3, and a capacitor C1. The control circuit further includes an analog switch AS1 switched in response to a signal S1.

A capacitor C2 and a resistor R4 constitute a high-pass filter. Resistors R5 and R6, and an amplifier A2 constitute a preamplifier for amplifying an output from the high-pass filter. An amplifier A3 and resistors R7 and R8 constitute an inverter having a gain of $-1$. This inverter inverts an output signal from the preamplifier A2.

An integrator MINT, for integrating an output from the preamplifier A2, is constituted by a Miller integrator comprising an amplifier A4 and a capacitor C3. Analog switches AS2, AS3, and AS4 are turned on/off in response to signals S2, S3, and S4. A resistor R9 is connected to the inverting input terminal of an integrator A4. Voltage-division resistors R11, R12, and R13 are connected to comparators CP1 and CP2 to supply reference voltages thereto and are connected in series with each other. One terminal of the resistor R11 is grounded, and one terminal of the resistor R13 is connected to a $-V$ power source.

The operation of the distance measuring apparatus having the arrangement described above will be described with reference to FIGS. 1 to 3 and the timing charts of FIGS. 5 and 6.

Figure 5:
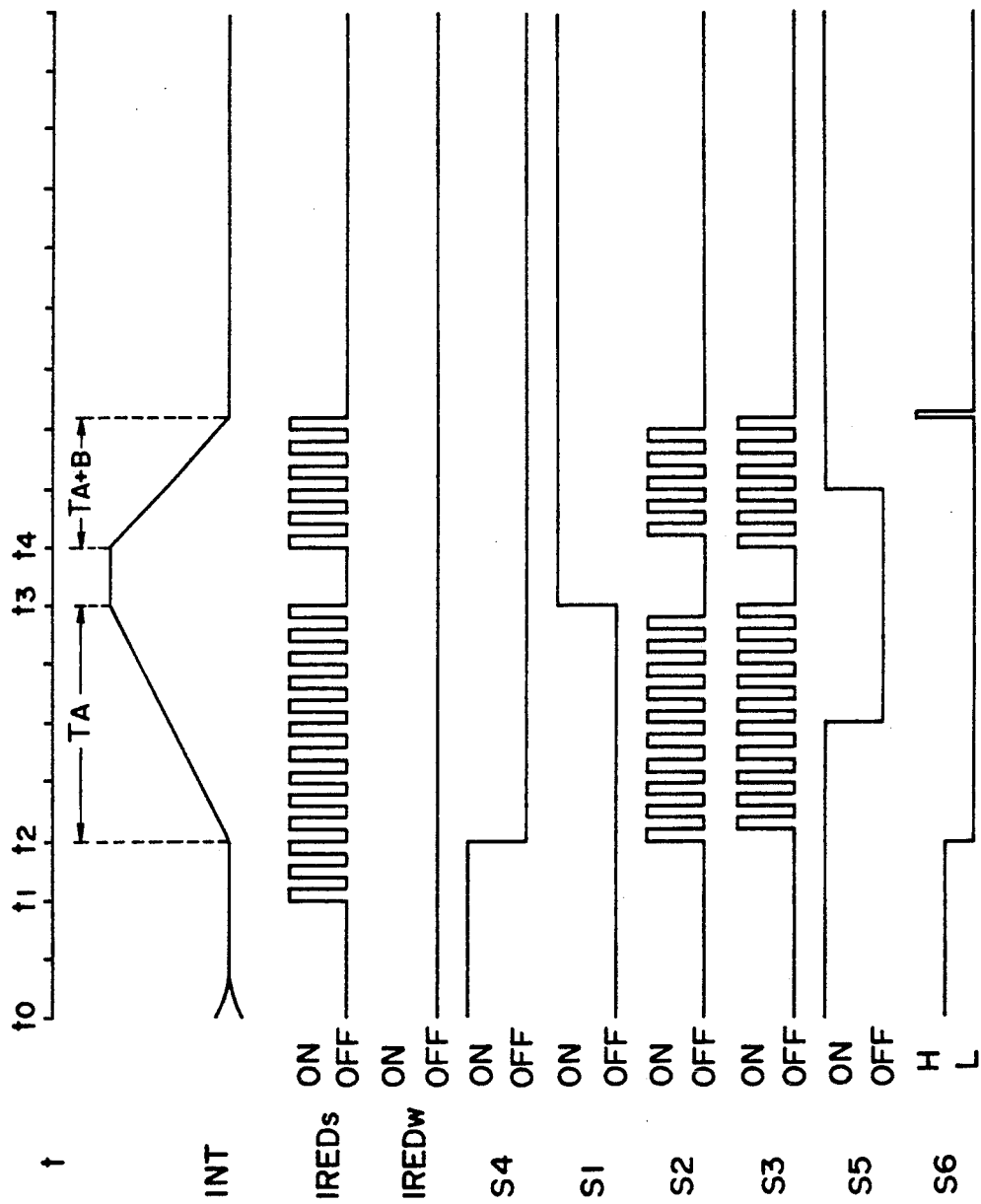
FIGS. 5 and 6 are timing charts showing the operation of the circuit shown in FIG. 4.
Figure 6:
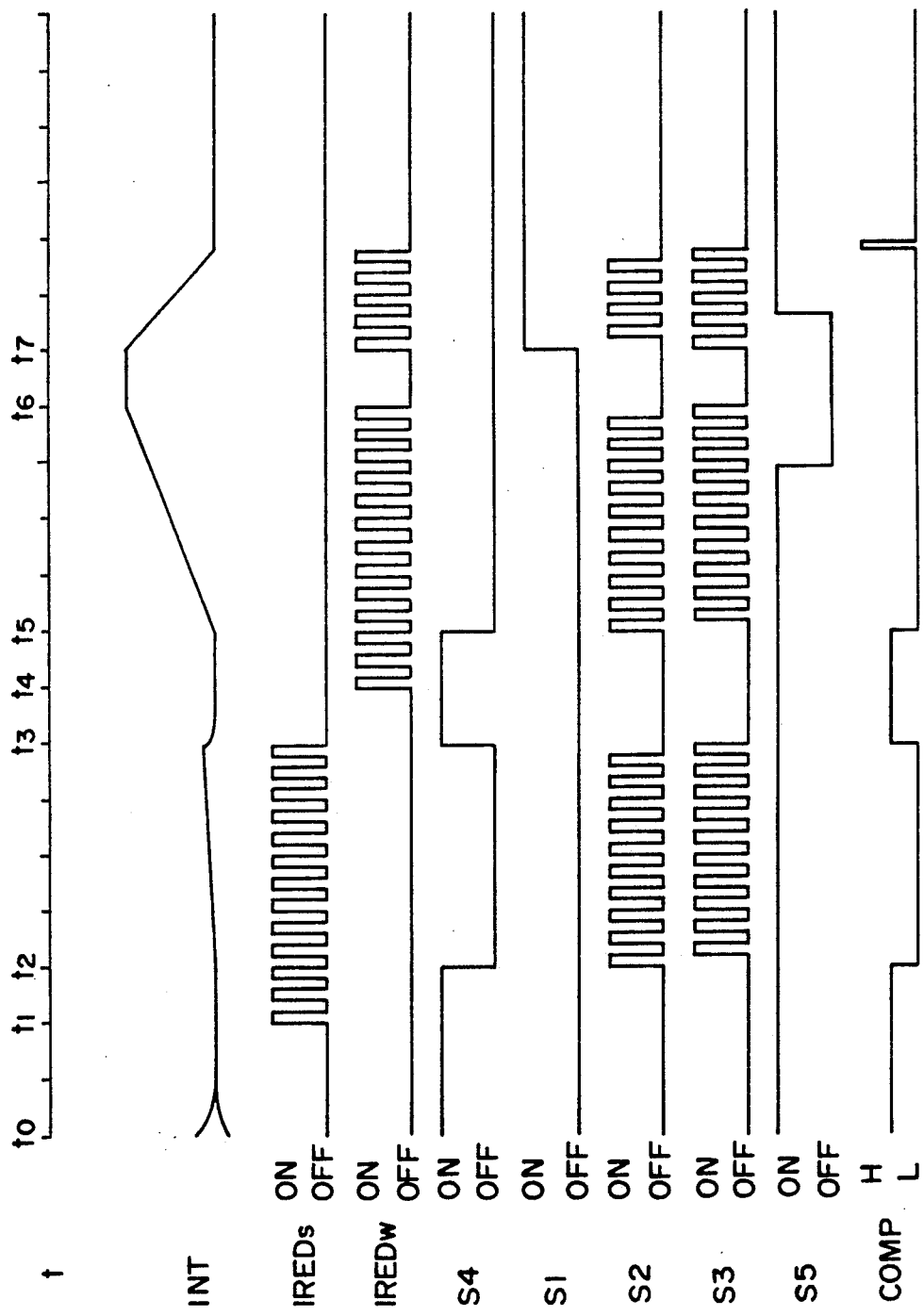

Referring to FIG. 5, when the camera release button LS is depressed at time t0, a signal S4 output from the logic circuit CONT is set at high level, and the analog switch AS4 is turned on. A loop circuit is thus constituted by the amplifier A4, the comparator CP2, the analog switch AS4, the resistor R10, and the resistor R9. In this case, if the voltage at the output terminal of the amplifier A4 is higher than that at the inverting input terminal of the comparator CP2, the output terminal of the comparator CP2 is set at high level. The capacitor C3 is charged through the analog switch AS4 and the resistors R10 and R9. The voltage at the output terminal of the amplifier A4 is gradually decreased according to the charging voltage of the capacitor C3. When a predetermined period of time has elapsed, the voltage at the inverting input terminal of the amplifier A4 becomes equal to that of the output terminal of the comparator CP2. In this state, charging of the capacitor C3 is stopped.

However, if the voltage at the output terminal of the amplifier A4 is lower than that of the inverting input terminal of the comparator CP2, the reverse operation as described above is performed to discharge the capacitor C3. When the voltage at the inverting input terminal of the amplifier A4 becomes equal to that at the output terminal of the comparator CP2, discharging of the capacitor C3 is stopped, and thus a stable state can be obtained.

By the above operation, initialization of the Miller integrator MINT comprising the capacitor C3 and the amplifier A4 can be performed for a period between times t0 and t2.

During the period between times t1 and t2, signal IREDs repeats high and low levels to preliminarily turn on the light-emitting element IRs. This light-emitting element reaches in the thermal equilibrium state.

At time t2, the analog switch AS4 is opened to open a loop circuit consisting of the amplifier A4, the comparator CP2, the analog switch AS4, the resistor R10, and the resistor R9. Integration operation of the Miller integrator MINT is started. At this time, a signal S1 from the logic circuit CONT is kept at low level, and thus the analog switch AS1 is kept off. Therefore, only the light-receiving element SPC2 is connected to the input terminal of the amplifier A1.

For a period between times t2 and t3, the analog switch AS2 is turned on when the light-emitting element IRs is turned on. The analog switch AS3 is turned on when the light-emitting element IRs is turned off. In this manner, the analog switches AS2 and AS3 are alternatively turned on in response to control signals S2 and S3. When the analog switch AS2 is turned on, the beam emitted from the light-emitting element IRs and reflected by the object is integrated by the Miller integrator MINT as an output voltage corresponding to the intensity of beam incident on the light-receiving element SPC2. When the analog switch AS3 is turned on, the light-emitting element IRs is kept off. In this case, an output corresponding to external light excluding the signal beam is integrated by the integrator MINT as an inverted signal from the amplifier A3, thereby canceling the influence of external light.

The capacitor C3 is charged for a predetermined period (TA) between times t2 and t3. A voltage across the capacitor C3 is increased according to an amount of light incident on the light-receiving element SPC2, as indicated by a waveform INT in FIG. 5.

In this case, if a distance to the object at the center of the screen to which light is emitted onto the light-emitting element IRs is finite, the signal beam having an intensity exceeding a given level is reflected although such reflection also depends on the reflectance of the object. Therefore, an output INT from the integrator MINT is increased. However, if a distance to the object is very long, the signal beam is not almost reflected by the object. In this case, an increase in output from the Miller integrator MINT is very small. A voltage level for determining whether the distance to the object is finite or infinite is determined by the resistors R11, R12, and R13. The determined voltage is input to the inverting input terminal of the comparator CP1. An output from the comparator CP1 is a low-level signal, i.e., S5 when the output INT from the integrator MINT exceeds the determined voltage level.

The low-level signal S5 is latched at time t3 to determine whether a distance to the object at the central portion within the field of view is finite.

When the distance to the object at the central portion is determined to be finite in response to the beam emitted from the light-emitting element IRs, the signal S5 goes low during the period between times t2 and t3. In this case, the logic circuit CONT changes the logic level of the signal S1 from low level to high level, thereby turning on the analog switch AS1. The light-receiving elements SPC1 and SPC2 are connected in parallel with each other to the input terminal of the amplifier A1. The circuit is arranged such that the beams from the object are switched to be incident on both light-receiving elements. The analog switches AS2 and AS3 are opened in response to the signals S2 and S3. The integration operation of the Miller integrator MINT is interrupted. The Miller integrator MINT does not receive an input by the transient variation in the amplifier A2 which is caused by switching operation between the light-receiving elements SPC1 and SPC2.

At time t4, the integration is started at a timing 180° out of phase during the period between times t2 and t3 such that the analog switch AS3 is turned on when the light-receiving element IRs is turned on; and the analog switch AS2 is turned on when the light-emitting element IRs is turned off.

A voltage having a polarity opposite to that during the period between times t2 and t3 is applied to the inverting input terminal of the amplifier A4 in the Miller integrator MINT. An output from the integrator MINT is gradually decreased after time t4. When the output INT from the Miller integrator MINT is lower than a threshold value of the comparator CP2, the output terminal of the comparator CP2 goes low. The signal S6 causes the distance measurement end signal to be input to the logic circuit CONT.

If an ascending integration period between times t2 and t3 is given as $T_A$, a descending integration period from time t4 to the end of distance measurement is given as $T_{A+B}$, an output current value of the light-receiving element SPC2 is given as A, and an output current value of the light-receiving element SPC1 is given as B, a charging voltage of the capacitor C3 during ascending integration and a descending voltage of the capacitor during descending integration yield the following equations:

$$T_{A+B}/T_A = A/A+B \qquad (1)$$

$$T_{A+B} = \{A/(A+B)\}T_A \qquad (2)$$

According to equation (2), if the integration time $T_A$ is predetermined, the integration time $T_{A+B}$ is measured to obtain a distance to the object according to a ratio $A/A+B$ of output voltages from the light-receiving elements.

If a distance to the object at the center of the frame is finite, it is measured, and focusing is performed in the camera according to distance measurement information. The user then takes a picture with the camera in this state.

However, if a distance to the object at the center of the frame is infinite, the distance to the object is detected to be infinite although it is actually finite since the object is not located at the center of the frame, i.e., the field of view. In this case, the beam emitted from the light-emitting element IRs passes by the object toward the background. This case will be described with reference to FIG. 6.

If an object at the center of the frame is actually located far from the camera, the reflected light has a low level. At time t3, an ascending level of the output INT from the Miller integrator MINT is small. For this reason, at time t3, the output from the comparator CP1 is kept at high level. The distance to the object at the center of the frame is determined by the logic circuit CONT to be infinite. In this case, the major object depends on the environment thereof. The light-emitting elements IRw1 and IRw2 are switched to turn on to emit beams on the peripheral portions of the frame to perform ascending and descending integrations.

The analog switch AS4 is closed for a period between times t3 and t5 to initialize the Miller integrator MINT as described above. For a period between times t4 and t5, the light-emitting elements IRw1 and IRw2 perform preliminary emission. For a period between times t5 and t6, ascending integration is performed. This integration is interrupted for a period between times t6 and t7, and then descending integration is started after time t7.

The distances to the peripheral portions of the frame are measured as described above, and the resultant information is used to focus the photographing lens. In this state, the user takes a picture of the desired object.

In the above embodiment, when a distance to the object at the center of the frame is infinite, the distance to the object at the peripheral portions is measured as distance measurement information. However, if the distances to the peripheral portions are also determined to be infinite, the distance of the object to the center of the frame may be measured again.

In the above embodiment, the distance to the object at the center of the frame is measured to determine if it is infinite. However, distances to the objects at the peripheral portions of the frame may be first measured to determine if they are infinite. In this case, the signals IREDw and IREDs in FIG. 4 are reversed.

The light-emitting element area is divided into two groups, i.e., the central and peripheral area groups. However, the element area may be divided into three or more groups, and these groups may have a measurement priority.

Figure 7:
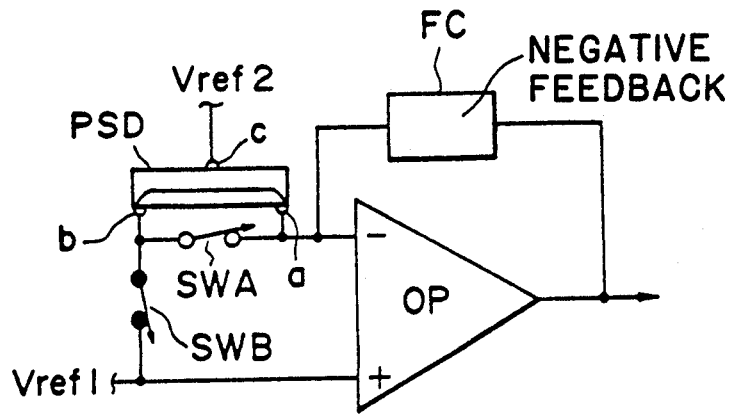
FIGS. 7 and 8 are respectively circuit diagrams showing other embodiments of the light-receiving section shown in FIG. 4.
Figure 8:
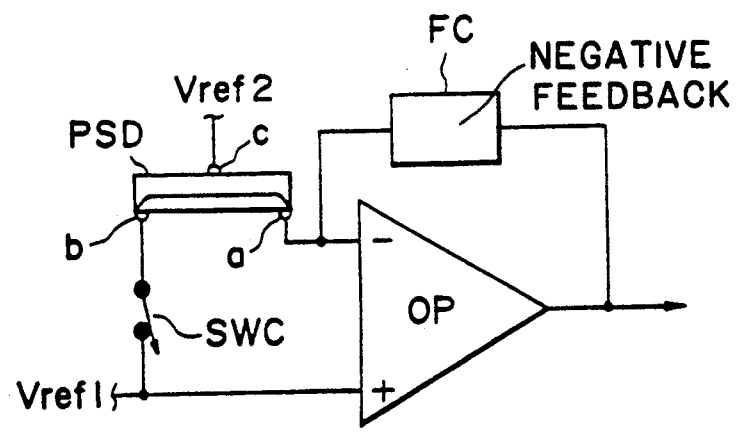

FIGS. 7 and 8 are circuit diagrams of light-receiving sections when light-receiving elements in FIG. 4 are constituted by PSD.

Referring to FIG. 7, an operational amplifier OP corresponds to the amplifier A1 shown in FIG. 4. A negative feedback circuit FC corresponds to resistors R1 R2 and R3 and a capacitor C1 shown in FIG. 4. A Position Sensitive Detection PSD has signal electrodes a and b and a common electrode C. Switches SWA and SWB are turned on/off in the distance measurement sequence and may comprise semiconductor switches or mechanical switches as in the switch S1 of FIG. 4. Reference voltage Vref1 and Vref2 are input to the noninverting input terminals of the operational amplifiers OP, respectively.

Referring to FIG. 7, when the switch SWA is opened and the switch SWB is closed, the reference voltage Vref1 is applied to the signal electrode b. When one signal electrode of the semiconductor position detector PSD receives a bias voltage, it generates a signal current (corresponding to the output A from the SPC2 in FIG. 4) across the electrodes a and b from the other signal electrode. This current represents a value corresponding to the position of light reflected by the object and incident on the detector. When the switch SWA is closed and the switch SWB is opened, the one electrode of the semiconductor position detector PSD is opened, an output representing all received light (i.e., a sum of the A output from the electrode a and the B output from the electrode b) is output from the electrode a, thereby obtaining the sum signal A+B from the SPC1 and SPC2 in FIG. 4.

FIG. 8 is a circuit diagram showing a modification of FIG. 7. The reference numerals as in FIG. 7 denote the same parts in FIG. 8. Referring to FIG. 8, the switch SWA in FIG. 7 is omitted. A switch SWC corresponding to the switch SWB is arranged. The switch SWC is closed to obtain the output A and is opened to obtain an output A+B, unlike in the arrangement of FIG. 7. In the above embodiments, ascending and descending integrations as a double integration scheme are used to measure a distance between the camera and the object. According to this scheme, a distance to the object at the central or peripheral portion of the field of view is measured. If the measured value is infinite, the distance to the other of the central and peripheral portions is measured. Regardless of the object position within the field of view, accurate distance measurement can be performed with a compact arrangement employing a wide field of view. A long distance measurement period which is the common disadvantage for the apparatuses of this scheme can be shortened since an infinite distance is determined when ascending integration is completed.

FIGS. 9 to 13 show another embodiment of the present invention. Unlike in the above embodiment wherein the infinite distance is determined at the end of ascending integration, the embodiment of FIGS. 9 to 13 further shorten a period for determining the infinite distance. Therefore, the distance measurement time can be further shortened.

Figure 9:
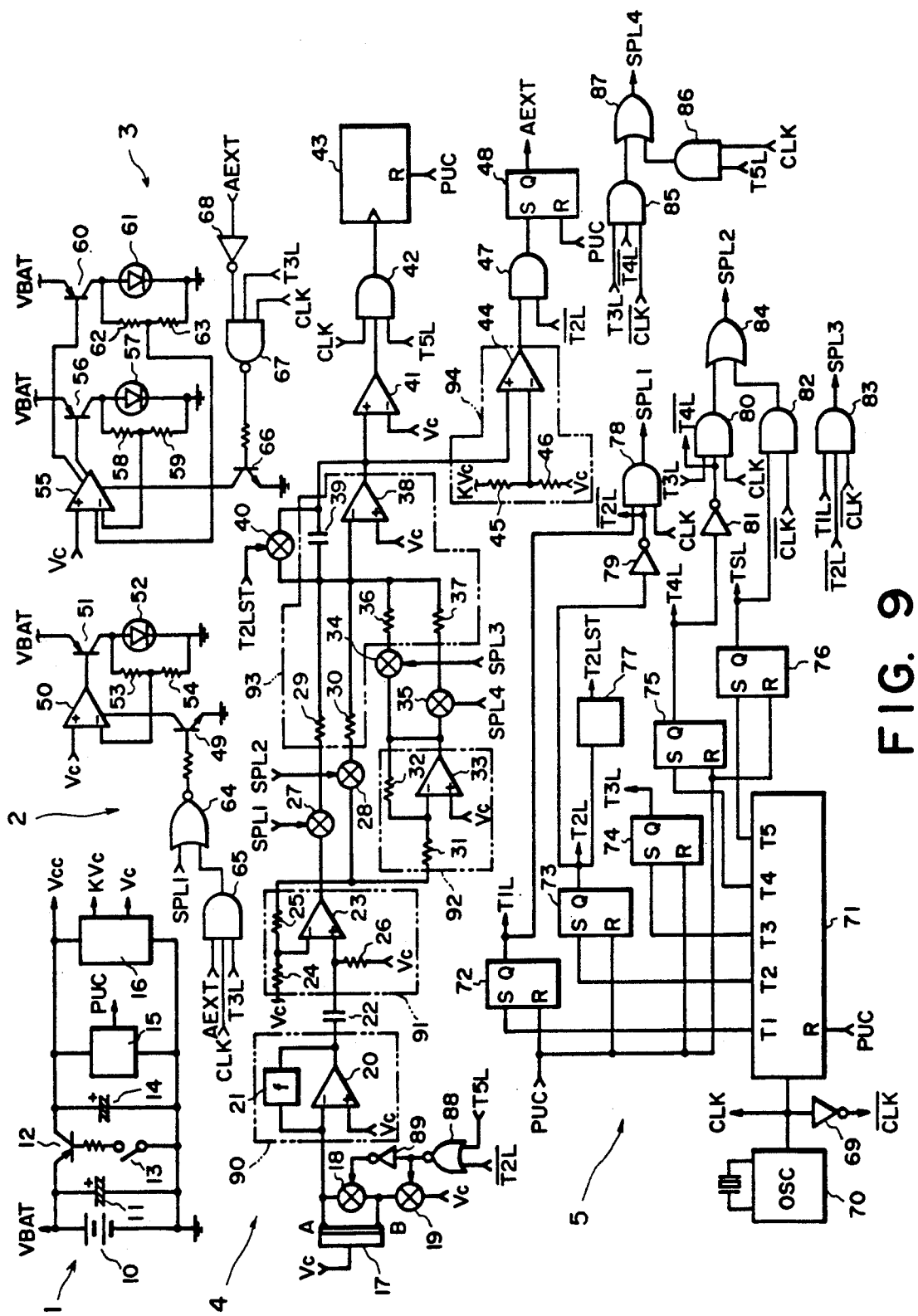
FIG. 9 is a circuit diagram showing still another embodiment of the distance measuring apparatus according to the present invention.

FIG. 9 shows the main part and part of the circuit associated with the main part.

A circuit 1 illustrated at the upper left corner in FIG. 9 is a power source circuit for supplying a constant voltage to light-emitting and light-receiving means, an optical signal processing means, and a control means. The power source circuit includes batteries 10, coupling capacitors 11 and 14, a transistor 12, a switch 13 closed by the first stroke of the camera release button, a start pulse generator 15 for generating a start pulse PUC when the switch 13 is closed, and a reference voltage generator 16 for supplying reference voltages Vc and KVc (KVc>Vc) to the respective circuit components.

A circuit 2 illustrated at the upper center in FIG. 9 includes a light-emitting element 52 as a light-emitting means for emitting a signal such as an infrared ray or the like to the central area of the field of view, a transistor 51 for supplying a current to the light-emitting element 52, an operational amplifier (to be referred to as OP amp hereinafter) 50 serving as a control means for the transistor 51, a transistor 49 for enabling or disabling an output from the OP amp 50, resistors 53 and 54 for keeping a voltage across the light-emitting element 52 constant, and NOR and AND gates 64 and 65 for controlling the transistor 49. The AND gate 65 constitutes part of a switching means described below.

A circuit 3 illustrated in the upper right corner in FIG. 9 includes light-emitting elements 57 and 61 as light-emitting elements for emitting signals such as infrared rays to the peripheral areas of the field of view, and circuit elements for controlling light emission of the light-emitting elements 57 and 61. The circuit 3 also includes transistors 56 and 60 for supplying drive currents to the light-emitting elements 57 and 61, an OP amp 55 for controlling the transistors 56 and 60, resistors 58, 59, 62, and 63 for keeping voltages across the light-emitting elements 57 and 61 constant, a transistor 66 for enabling or disabling an output from the OP amp 55, a NAND gate 67 for controlling the transistor 66, and an inverter 68 for controlling the NAND gate 67. The AND gate 65, the NAND gate 67, and the inverter 68 constitute part of a distance measurement switching means for switching the area subjected to distance measurement at the time of distance measurement after an infinite distance is discriminated, as will be apparent from the following description. The AND gate 65 and the inverter 68 are operated in response to an output from the level detecting means for the received optical signal when the infinite distance is discriminated.

A circuit 4 illustrated at the middle portion from the left to the right in FIG. 9 is a circuit network for processing an output signal from a light-receiving element 17 to calculate a distance value. The circuit 4 includes the light-receiving element 17 of a Position Sensitive Detection element (PSD) as a receiving means for generating an output current corresponding to the position of the incident light; an analog switch 18 connected between two output terminals A and B of the light-receiving element 17; an analog switch 19 arranged between the output terminal B and a reference voltage Vc; an inverter 89 for controlling the analog switch 18; a NOR gate 88 for controlling the analog switches 18 and 19; a current-voltage converter 90 consisting of an OP amp 20 and a frequency selector 21 arranged in the feedback path of the inverting input terminal of the OP amp 20; a noninverting amplifier 91 consisting of a DC blocking capacitor 22, an OP amp 23, and external resistors 24, 25 and 26; an inverting amplifier 92 consisting of an OP amp 33 and external resistors 31 and 32; a variable time constant integrator 93 consisting of an OP amp 38, a capacitor 39 arranged in the feedback path of the inverting input terminal thereof, and resistors 29, 30, 36, and 37 connected in parallel with each other to the inverting input terminal of OP amp 38; analog switches 27, 28, 34, and 35 for sampling output signals from the amplifiers 91 and 92 and changing a time constant of the integrator 93; an analog switch 40 for controlling to enable or disable the integrator 93; a distance measuring comparator 41 connected to the output terminal of the integrator 93 and operated in response to a level of an output signal from the integrator 93; an AND gate 42 operated in response to distance measuring start and end timings; a counter 43 for performing a distance operation; a comparator 94 serving as a level detecting means for determining whether the level of the received signal (i.e., an output from the integrator 93 during ascending integration) during infinite distance discrimination has reached a predetermined level; an AND gate 47 operated in response to an output from the comparator 94 synchronized with the output from the comparator 94 during infinite distance discrimination; and an RS-FF (flip-flop) 48 as part of the distance measurement area switching means for switching the areas subjected to distance measurement in response to the output from the comparator 94. The comparator 94 comprises an OP amp 44 and resistors 45 and 46 connected in parallel with each other to the inverting input terminal of the OP amp 44. The resistors 45 and 46 are connected to reference voltage sources KVc and Vc. The OP amp 44 as a comparator receives voltages obtained by dividing the reference voltages KVc and Vc by the resistors 45 and 46.

In the integrator 93, the resistor 29 connected to the input terminal of the OP amp 38 has a lower resistance than that of the resistor 30. The resistor 36 has a lower resistance than that of the resistor 37. The resistors 29 and 36 have an identical resistance and serve to determine a time constant of the integrator 93 when the infinite distance is determined prior to distance measurement. The resistors 30 and 37 have higher identical resistances and serve to set a time constant of the integrator 93 during infinite distance discrimination. When the analog switches 27, 28, 34, and 35 connected to the input terminals of these resistors are turned on, these resistors are connected to the output terminals of the amplifiers 91 and 92. However, when the analog switches 27, 28, 34, and 35 are turned off, these resistors are disconnected from the output terminals of the amplifiers 91 and 92.

In the circuit 4, the section including the current-voltage converter 90, the noninverting amplifier 91, and the integrator 93 is used commonly for infinite distance discrimination and distance measurement. However, the comparator 94, the AND gate 47, and the RS-FF 48 are used for detecting the level of the received optical signal at the time of infinite distance discrimination and subsequent distance measurement switching. The comparator 41, the AND gate 42, and the counter 43 constitute part of the distance measurement executing means.

The means used for infinite distance discrimination and the means for distance measurement execution are constituted by the components in the circuit 4, components of a circuit 5 described below, and the NOR gate 64, the AND gate 65, the NAND gate 67, and the inverter 68 in the circuits 2 and 3.

The circuit 5 illustrated in the lowermost position in FIG. 9 serves as a control means for controlling the circuit 4 as the received signal processing means and a control means for controlling the light-emitting element 52, 57, and 61. The circuit 5 includes a timer means during infinite distance discrimination. The circuit 5 includes an oscillator 70 for generating a clock pulse, an inverter 69 for inverting the polarity of the clock pulse, a frequency divider 71 constituting a timer means for generating time-serial timing signals T1, T2, T3, T4, and T5, five RS-FFs 72, 73, 74, 75 and 76 set in response to timing signals T1 to T5 and reset in response to an output signal PUC from the start pulse generator 15, a stop pulse generator 77 for setting the normal end timing of infinite distance discrimination (to be described later) and included in the timer means, AND gates 78, 80, 82, 83, 85, and 86 operated in response to the outputs from the RS-FFs 72, 73, 74, 75, and 76, OR gates 84 and 87, and inverters 79 and 81. In the circuit 5, the section for generating the timing signals T1 and T2 and the section responsive to the timing signals T1 and T2 constitute the infinite distance discriminating means for executing infinite distance discrimination. The section for generating the timing signals T3, T4, and T5 and the section responsive to the timing signals T3, T4, and T5 constitute the distance measurement executing means in the circuit 5.

The operation of the distance measuring apparatus having the arrangement described above will be described with reference to FIGS. 9 to 11.

When the user looks through an eyepiece at the timing of photographing and decides framing, he depresses the shutter release button up to the first stroke. In this state, the switch 13 is closed to turn on the transistor 12. The batteries 10 are connected to the start pulse generator 15. The start pulse PUC is generated by the pulse generator 15. The start pulse is applied to the reset input terminal of the frequency divider 71 and to the reset input terminals of the RS-FFs 72, 73, 74, 75, and 76, the RS-FF 48 and the counter 43. Therefore, the frequency divider 71, the RS-FFs 72, 73, 74, 75, and 76, the RS-FF 48, and the counter 43 are reset to the initial state.

When the frequency divider 71 is reset, the clock pulse CLK generated by the oscillator 70 is supplied to the frequency divider 71 and frequency-divided into timing pulses of a proper time series. At time t1, a first timing signal T1 is generated from the first output terminal. The signal T1 is supplied to the set terminal of the RS-FF 72. For this reason, the RS-FF 72 is set, and a signal T1L of "H" level appears at the Q output terminal of the RF-FF 72. The signal T1L is applied to the AND gates 78 and 83. At this time, a signal T2L of "H" level from the RS-FF 73 is not applied to the inverter 79 connected to the input terminal of the AND gate 78. Therefore, the AND gate 78 is turned on to generate a pulse signal SPL1 (FIG. 10) synchronized with the clock pulse CLK at the output terminal of the AND gate 78.

The AND gate 83 is designed to be turned on in response to the signal T1L, an output $\overline{\text{T2L}}$ from the inverter 79, and an output $\overline{\text{CLK}}$ for the inverter 69. When the signal T1L is applied, the AND gate 83 is turned on and generates a signal SPL3 (FIG. 10) synchronized with the phase inverted signal $\overline{\text{CLK}}$ of the clock pulse CLK.

The signal SPL1 is applied to the analog switch 27 in the integrator 93, and the signal SPL3 is applied to the analog switch 34. For this reason, the analog switch 27 repeats ON/OFF operation according to the pulse period of the signal SPL1. The analog switch 34 repeats ON/OFF operation according to the period of the signal SPL3. When the signal SPL1 is set at "H" level, the resistor 29 is connected to the output terminal of the noninverting amplifier 91. When the signal SPL3 is set at "H" level, the resistor 36 is connected to the output terminal of the inverting amplifier 92. For this reason, the output terminal of the noninverting amplifier 91 and the output terminal of the inverting amplifier 92 are alternately connected to the inverting input terminal of the OP amp 38 in the integrator 93 through resistors 29 and 36. When the time constant resistor 29 in the integrator 93 is connected to the OP amp 38, a time constant is determined by the product of the resistance of the resistor 29 and the capacitance of the capacitor 39. However, when the resistor 36 is connected to the OP amp 38, the time constant is determined by the product of the resistance of the resistor 36 and the capacitance of the capacitor 39. As described above, since the resistance of resistor 29 is equal to that of the resistor 36, the outputs from the inverting amplifiers 91 and 92 are input to the integrator having the same and predetermined time constant.

The operation of the circuit 4 will be described later.

The signal SPL1 generated by the AND gate 78 is applied to the analog switch 27, as described above, and at the same time to the NOR gate 64 in the circuit 2. The NOR gate 64 enables and disables the signal PL1 according to the pulse period thereof (Note that level "L" is set when SPL1 is set at "H" since the polarity is inverted). The transistor 49, the OP amp 50, and the transistor 51 repeat ON/OFF operation in response to the output from the NOR gate 64. The light-emitting element for emitting the beam onto the central area of the photographing field of view starts ON/OFF operation flashes at the same period. The infrared beam projected onto the central area of the field of view from the light-emitting element 52 is reflected by the object present in this area, as described with reference to FIGS. 1 and 3, and the reflected beam is incident at a position of the light-receiving element 17 corresponding to the distance to the object. Current outputs representing the incident position of the incident light appear at the output terminals A and B of the light-receiving element 17.

If all currents generated by the light-receiving element 17 are defined as I, a distance between the output terminals A and B of the light-receiving element 17 is defined as L, and a distance from the incident light position and the position of the terminal A is defined as x, a current IA generated by the terminal A is $IA = \{(L-x)/L\}I$.

In this case, the operation of the light-emitting element belongs to infinite distance discrimination as a characteristic feature of the apparatus according to the present invention. The operation time of the light-emitting element 52 is given to be a shorter period than that required for ascending integration in distance measurement.

The analog switch 18 is kept on and the analog switch 19 is kept off. The outputs from the output terminals A and B of the light-receiving element 17 are connected through the analog switch 18. An output current (IA + IB) from the output terminals A and B is applied to the current-voltage converter 90.

A DC component (i.e., the reference voltage KVc applied to the light-receiving element 17) of the voltage signal converted by the current-voltage converter 90 is removed by the DC blocking capacitor 22. The resultant voltage comprises only an AC component. The AC voltage is then applied to the noninverting amplifier 91 and is amplified by a gain determined by the resistors 24, 25, and 26 of the amplifier 91.

At this time, since the signal SPL1 has already been applied to the analog switch 27, the analog switch 27 repeats ON/OFF operation according to the period of the signal SPL1. When the signal SPL1 is set at "H" level, the resistor 29 having a lower resistance is connected to the output terminal of the noninverting amplifier 91. Since the analog switch 40 arranged in the bypass of the capacitor 39 is kept off, an integration can be performed. When the analog switch 27 is turned on, the time constant of the integrator 93 is determined by the product of the resistance of the resistor 29 and the capacitance of the capacitor 39.

An output signal (this is VA+VB if the signals appearing at the output terminals A and B of the light-receiving element 17 are defined as VA and VB, respectively) from the noninverting amplifier 91 is applied to the inverting input terminal of the OP amp 38 through the resistor 29 when the analog switch 27 is turned on. In this case, the capacitor 39 is charged by a reverse-bias current flowing in the capacitor 39. The output terminal voltage of the OP amp 38 is increased at a ramp determined by the above time constant.

Since the output from the noninverting amplifier 91 is input to the inverting amplifier 92, a voltage obtained by inverting the polarity of the output from the noninverting amplifier 91 appears at the output terminal of the OP amp 33 in the inverting amplifier 92. At this time, as described above, since the analog switch 34 in the integrator 93 repeats ON/OFF operation in response to the signal SPL3, the output from the inverting amplifier 92 is sampled when the signal SPL3 is set at "H" level. The sampled signal is applied to the inverting input terminal of the OP amp 38 through the resistor 36.

Figure 10:
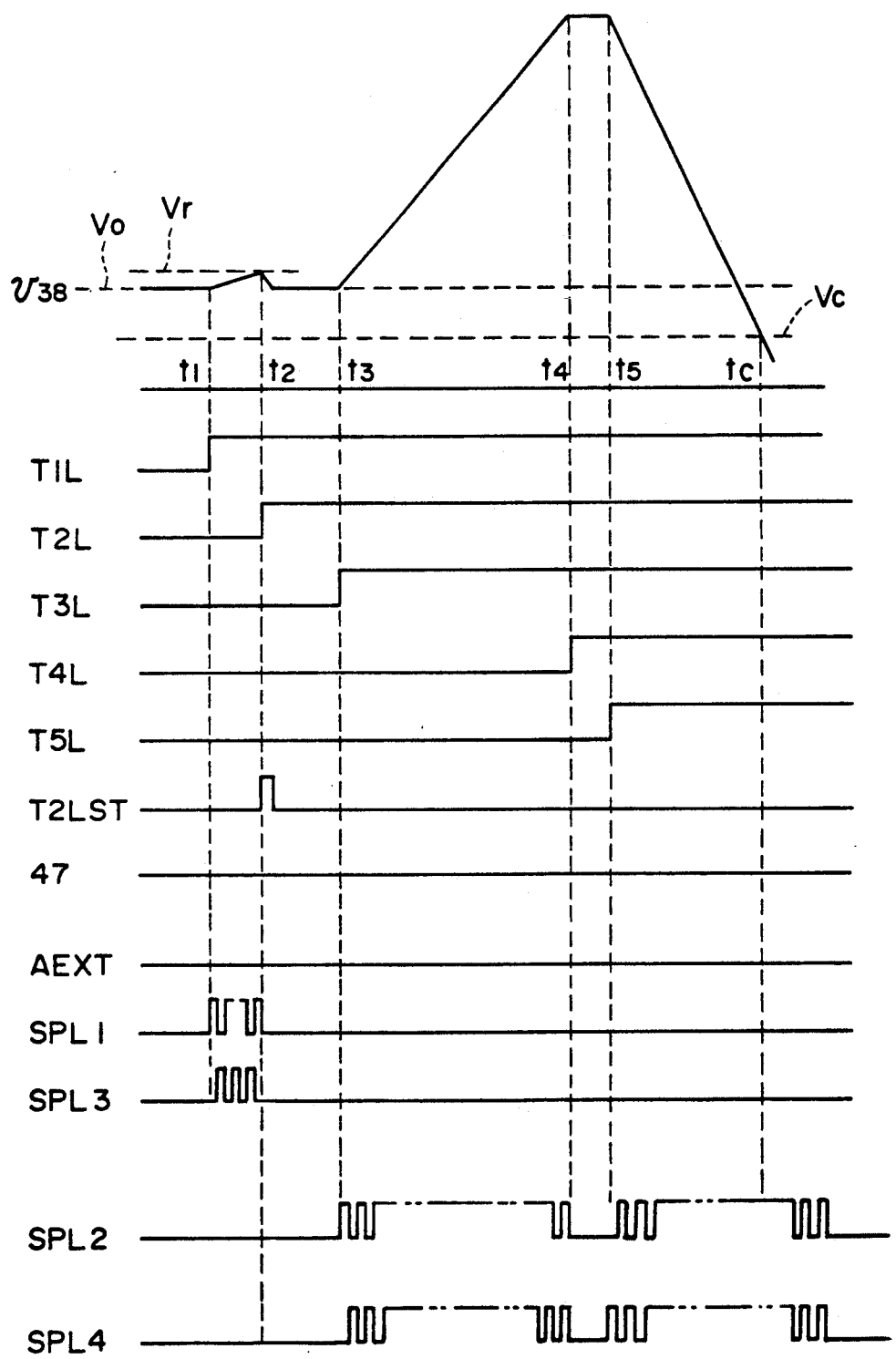
FIGS. 10 and 11 are timing charts showing signals generated in the circuit shown in FIG. 9.

Since the phases for "H" levels of the signals SPL1 and SPL3 are shifted from each other, as shown in FIG. 10, the outputs from the noninverting amplifier 91 and the inverting amplifier 92 are alternately applied to the OP amp 38 in the integrator 93. Since the resistance of the resistor 29 is equal to that of the resistor 36, the outputs from the noninverting amplifier 91 and the inverting amplifier 92 are integrated by the integrator 93 at the same time constants.

A waveform V38 in FIG. 10 shows changes in output voltage from the OP amp 38 in the integrator 93. The voltage at the output terminal of the OP amp 38 is applied to the comparator 94 serving as the optical signal level detecting means. The output voltage from the OP amp 38 for a period between times t1 and t2 is compared with a reference value set by the comparator 94. Until time t2, the signal T2L appearing at the Q output terminal of the RS-FF 73 is kept at "L" level. The signal $\overline{T2L}$ obtained by inverting the signal T2L and input from the inverter 79 to the AND gate 47 is set at "H" level. The comparison result from the comparator 94 is output to the RS-FF 48 through the AND gate 47. It should be noted that the reference value is a value Vr (FIG. 10) obtained by dividing the reference voltage KVc by the resistors 45 and 46.

A voltage at the output terminal of the OP amp 38 is also applied to the comparator 41, and an output from the comparator 41 is blocked by the AND gate 42 (the signal T5L is not input yet).

In the distance measuring apparatus of this embodiment, light emission for a short period of time can be performed prior to distance measurement. At the same time, during ascending integration of the received optical signal, it is determined whether the level of the received optical signal reaches the predetermined level Vr, thereby determining an infinite distance. However, the level of the received optical signal varies circuit operation. Therefore, in the following description, a case wherein the level of the reflected optical signal from the central area within the field of view is lower than the predetermined level Vr will be separately described from a case wherein the level of the reflected optical signal from the central area within the field of view is higher than the predetermined level Vr.

(i) The case wherein the ascending integrated value of the output signal from the light-receiving element 17 does not reach the reference value Vr of the comparator 94 before the next timing signal T2 is generated after the timing signal T1 is generated by the frequency divider 71 (FIG. 10).

When the output voltage from the OP amp 38 in the integrator 93 does not reach the reference value Vr set in the comparator 94 in a period between times t1 and t2 (before the timing signal T2 is generated) and then the object is located in an infinite position and the emitted beam is assumed not to be reflected by the object, the voltage at the output terminal of the OP amp 44 in the comparator 94 is kept at "L" level. The output voltage from the AND gate 47 is also kept at "L" level. A Q output terminal AEXT of the RS-FF 48 is kept at "L" level. Inputs AEXT to the AND gates 65 and the inverters 68 in the circuits 2 and 3 are not changed. Until time t2, the light-emitting element 52 is kept flashed. Since the output voltage from the NAND gate 67 is kept at "H" level, the transistor 66 is turned on, and the OP amp 55 is turned off. The light-emitting elements 57 and 61 are kept inoperative.

When the timing signal T2 is generated by the frequency divider 71 at time t2, the RS-FF 73 is set. The signal T2L of "H" level appears at the Q output terminal of the RS-FF 73. The signal T2L is applied to the stop pulse generator 77 and the inverter 79. For this reason, the stop pulse generator 77 generates a stop pulse T2LST (FIG. 10), and this pulse is applied to the analog switch 40 in the integrator 93. The analog switch 40 is then turned on, and the both terminals of the capacitor 39 form a short circuit. The charges stored in one electrode plate of the capacitor 39 are discharged through the analog switch 40. As a result, the voltage at the output terminal of the OP amp 38 is decreased according to a time constant determined by the capacitor 39 and the resistors 29 and 36 and eventually returns to the initial voltage Vc.

The stop pulse T2LST is immediately disabled, and the analog switch 40 is then turned off. The short circuit of the capacitor 39 is cancelled. The integrator 93 is reset to the initial state.

In the inverter applied with the signal T2L, its output voltage is set at "L" level, and the signal $\overline{T2L}$ is generated. When the signal $\overline{T2L}$ is applied to the AND gate 78, the AND gate 78 is turned off to disable the signal SPL1. As a result, the output voltage at the NOR gate 64 is inverted to "H" level, and thus the transistor 49 is turned on. The OP amp 50 is thus rendered operative. The transistor 51 is then turned off, and the light-emitting element 52 is also turned off.

Since the signal $\overline{T2L}$, is also applied to the AND gate 83, the AND gate 83 which has been operative is rendered inoperative. The signal SPL3 is then disabled. When both the signals SPL1 and SPL3 are disabled, the analog switches 27 and 34 are turned off in the circuit 4. The integrator 93 is disconnected from the noninverting and inverting amplifiers 91 and 92.

Since the signal $\overline{T2L}$ is input to the NOR gate 88, the output voltage at the NOR gate 88 goes to "H" level, and the analog switch 19 is turned on. The output voltage at the inverter 89 is set at "L" level, and the analog switch 18 is turned off.

Only the output terminal A of the light-receiving element 17 is connected to the input terminal of the current-voltage converter 90.

At time t3 after the respective circuits are set as described above, the timing signal T3 is supplied from the frequency divider 71 to the RS-FF 74. The signal T3L of "H" level appears from the Q output terminal of the RS-FF 74. The signal T3L is applied to the AND gates 80 and 85 which are then turned on. The signal SPL2 is generated by the OR gate 84, and the signal SPL4 is generated by the OR gate 87. The signals SPL2 and SPL4 are respectively applied to the analog switches 28 and 35. For this reason, the analog switch 28 repeats ON/OFF operation according to the pulse period of the signal SPL2. The analog switch 35 repeats ON/OFF operation according to the period of the signal SPL4. Since the polarity of the clock pulse CLK applied to the AND gate 80 is opposite to that of the clock pulse $\overline{CLK}$ applied to the AND gate 85, the analog switch 35 is turned off when the analog switch 28 is turned on, and vice versa.

The signal T3L is also applied to the AND gate 65 as a control means for the light-emitting element. In this case, an output voltage from the RS-FF is set at "L" level. The output voltage from the AND gate 65 is not inverted into "H" level. The two inputs to the NOR gate 64 are kept at "L" level. An output from the NOR gate 64 is then kept at "H" level. The transistor 49 is kept conductive, and the OP amp 50 is grounded. Therefore, the light-emitting element 52 is kept inoperative.

When the signal T3L is applied to the NAND gate 67, the output from the inverter 68 is set at "H" level, and the NAND gate 67 is enabled. A pulse output having the same period as that of the clock pulse CLK appears at the output terminal of the NAND gate 67. The transistor 66 repeats ON/OFF operation according to the period of the clock pulse from the time of application of the signal T3L. The output from the OP amp 55 is turned on/off according to the period of the clock pulse. The transistors 56 and 60 are also turned on/off in response to the operation of the OP amp 55. The two light-emitting elements 57 and 61 for emitting beams onto the peripheral areas within the photographing field of view start flashing at timings determined by the above period of the pulse.

When beams emitted onto the peripheral areas within the photographing field of view and reflected by the peripheral objects return and are incident on the light-receiving element 17, as described with reference to FIGS. 1 and 3, an output current appears at the output terminal of the light-receiving element 17. In this case, since the analog switch 18 is open, only the output current IA appearing at the output terminal A is input to the input terminal of the current-voltage converter 90. After the current IA is converted into a voltage VA by the current-voltage converter 90, the DC component of the voltage VA is eliminated by the DC blocking capacitor 22. Therefore, only the signal component voltage VA is applied to the noninverting amplifier 91. The signal amplified by the noninverting amplifier 91 is sampled by the analog switch 28, ON/OFF-operated according to the period of the signal SPL2. The sampled signal is applied to the OP amp 38 and the capacitor 39 through the high-resistance resistor 30. The output from the noninverting amplifier 91 is applied to the inverting amplifier 92, and an output from the inverting amplifier 92 is sampled by the analog switch 35, ON/-OFF-operated according to the period of the signal SPL4. The sampled signal is applied to the OP amp 38 and the capacitor 39 through the high-resistance resistor 37 (the resistance of the resistor 30 is the same as that of the resistor 37). In this case, since the analog switch 40 in the loop path of the capacitor 39 is open, the integrator 93 performs integration at a time constant determined by the product of the resistance of the resistor 30 or 37 and the capacitance of the capacitor 39. A voltage v38 appearing at the output terminal of the OP amp 38 is increased after time t3, as shown in FIG. 10.

At time t4, the timing signal T4 is generated by the frequency divider 71. The RS-FF 75 is set in response to the timing signal T4. The signal T4L of "H" level appears at the Q output terminal of the RS-FF 75. For this reason, upon reception of the signal T4L, the inverter 81 generates a signal $\overline{T4L}$ of "L" level. The AND gate 80 is turned off to stop generating the signal SPL2. Upon reception of the signal $\overline{T4L}$, the AND gate 85 is also disabled to stop generating the signal SPL4. Both the analog switches 28 and 35 are open, and the noninverting and inverting amplifiers 91 and 92 are disconnected from the integrator 93. A voltage (i.e., output voltage v38 from the OP amp 38) across the capacitor 39 is no longer increased. Therefore, the voltage V38 is kept constant, as shown in FIG. 10.

When the output voltage v38 from the integrator 93 is increased, the voltage v38 is also applied to the comparator 94 used as a received optical signal level detecting means at the time of infinite distance discrimination. When the voltage v38 becomes equal to the reference voltage Vr of the comparator 94, the output voltage of the OP amp 44 goes high, and one input is applied to the corresponding input terminal of the AND gate 47. In this case (i.e., a moment after time t2), since the signal $\overline{T2L}$ is set at logic "L" (FIG. 10), no output appears from the AND gate 47 and the RS-FF 48 is not set. Therefore, the operation of the AND gate 65, the inverter 68, and the NAND gate 67, all of which serve as control means for the light-emitting elements 52, 57, and 61, is not changed. As a result, the light-emitting elements 57 and 61 continue to flash.

The voltage v38 is also applied to the distance measurement comparator 41. When the input voltage of the comparator 41 is higher than the reference voltage Vc, the output voltage is set at "H" level. Except for time tc for measuring the distance (to be described later), the output voltage from the comparator 41 is set at "H" level, and ascending integration is also kept constant.

At time t5, the timing signal T5 is generated by the frequency divider 71 to set the RS-FF 76. The signal T5L of "H" level appears at the Q output terminal of the RS-FF 76. The signal T5L is applied to the NOR gate 88, and the output voltage from the NOR gate 88 is inverted to "L" level. The analog switch 19 is turned off to cut off the output terminal B of the light-receiving element 17 from the power source Vc. Since the output voltage from the inverter 89 is set at "H" level, the analog switch 18 is turned on to electrically connect the output terminal A to the output terminal B. For this reason, the sum of the output currents IA and IB appearing at the output terminals A and B of the light-receiving element 17 is input to the current-voltage converter 90.

When the signal T5L is applied to the AND gate 82, the pulse signal SPL2 synchronized with the input signal $\overline{CLK}$ from the inverter 69 appears at the output terminal of the AND gate 82. The signal SPL2 is a signal having a phase opposite to that of the signal SPL2 generated for a period between times t3 and t4. The AND gate 86 receives the signal T5L and generates a pulse output having the same phase as that of the clock pulses CLK. Therefore, the signal SPL4 having the same polarity as that of the clock pulses CLK is generated by the OR gate 87. The signal SPL4 is a signal having a phase opposite to that of the signal SPL4 generated for a period between times t3 and t4.

When the signals SPL2 and SPL4 are respectively applied to the analog switches 28 and 35, the analog switches 28 and 35 perform the ON/OFF operation at a timing 180° out of phase during the period between times t1 and t2. The output signals from the noninverting and inverting amplifiers 91 and 92 are sampled, and the sampled signals are applied to the integrator 91. In this case, the output voltage from the noninverting amplifier 91 is (VA+VB) (where VA is a voltage corresponding to the output current IA from the output terminal A of the light-receiving element 17, and VB is a voltage corresponding to the output current IB from the output terminal B of the light-receiving element 17). The output voltage from the inverting amplifier 92 is −(VA+VB).

The present sampling voltage has a polarity opposite to that generated for a period between times t3 and t4. When the voltages are applied from the noninverting and inverting amplifiers 91 and 92 to the integrator 93 through the analog switches 28 and 35, the charges stored in the capacitor 39 for the period between times t3 and t4 are discharged. As a result the output voltage v38 from the OP amp 38 in the integrator 93 after time t5 is integrated, that is, the capacitor 39 is discharged by a current determined by the input voltage, the resistor 30 (or resistor 37) and the capacitor 39 as shown in FIG. 10. In other words, descending integration is performed.

When the signal T5L is generated, this is applied to the AND gate 42. A pulse signal which is the same as the clock pulse CLK appears at the output terminal of the AND gate 42. The pulse signal is supplied as an input signal to the counter 43. The counter 43 starts counting the pulses of the input signal.

When the output voltage v38 of the integrator 93 is decreased from time t5 and reaches the reference voltage Vc of the comparator 41, the output voltage from the comparator 41 goes low. The output voltage from the AND gate 42 goes to "L" level, and the input signal is no longer supplied to the counter 43. In this state, the counter 43 stops counting the pulses of the input signal. A count value (i.e., the number of clock pulses supplied from the AND gate 42 for a period between times t5 to tc) of the counter 43 at time tc represents a distance measurement value between the camera and the object.

In the distance measuring apparatus of this embodiment, a beam is incident on the central area within the photographing field of view for a very short period of time as compared with the normal ascending integration time prior to distance measurement. Meanwhile, the level of the output signal from the light-receiving element is discriminated. When the output level does not reach the predetermined level Vr, the reflected beam is not returned and the object is discriminated as an infinite object. In this case, distance measurement is performed for the peripheral areas within the photographing field of view. Even if the object is not located in the central area within the field of view, the object can be focused in a short period of time. In addition, the user does not take a picture in an out-of-focus state.

Figure 11:
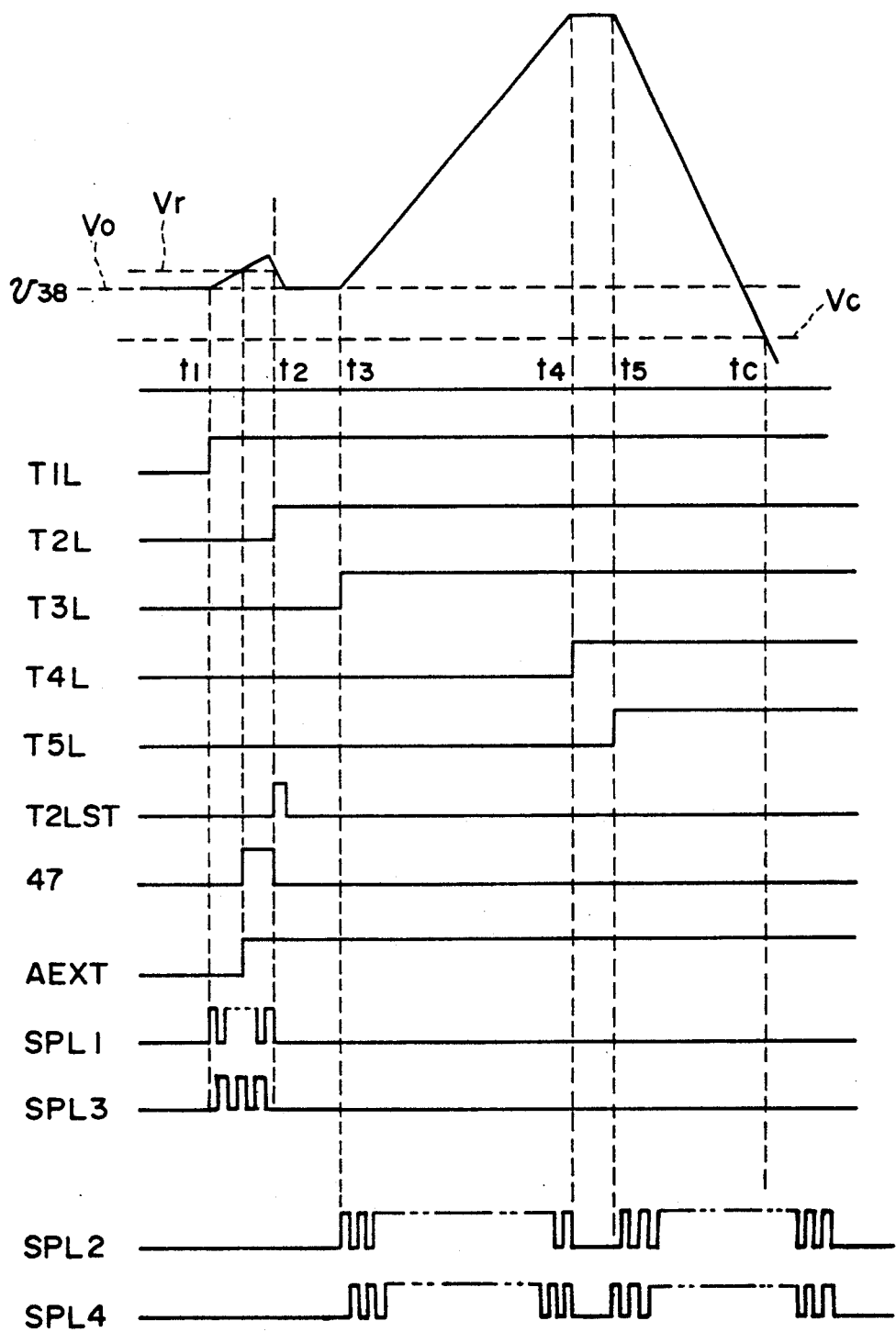

A circuit operation will be described with reference to FIGS. 9 and 11 when the level of the output signal from the light-receiving element at the time of infinite distance discrimination does not reach the predetermined level Vr before time t2 (that is, an object away from the camera by a finite distance is present in the central area within the photographing field of view since a given amount of reflected light is returned).

(ii) The case wherein the ascending integrated value of the output signal from the light-receiving element 17 reaches (FIG. 11) the reference value Vr of the comparator 14 before the next timing signal T2 is generated after the timing signal T1 is generated by the frequency divider 71 in the embodiment of FIG. 9.

When the output voltage v38 from the integrator 93 reaches the reference value Vr of the comparator 94 in a period between times t1 and t2, the output voltage from the comparator 94 is inverted from "L" level to "H" level, and the AND gate 47 is enabled. The voltage level of the output terminal of the AND gate 47 is inverted from "L" level to "H" level. For this reason, the RS-FF 48 is set, and an H level signal AEXT appears at the Q output terminal of the RS-FF 48. The signal AEXT is applied to the inverter 68 in the circuit 3, and the output voltage level of the inverter 68 is inverted from "H" level to "L" level. Up to this moment, the signal T3L is not generated yet. The output voltage of the NAND gate 67 is kept at "H" level. The transistor 66 is turned on, the output voltage from the OP and 55 is set at "H" level, and the transistors 56 and 60 are off. Under these conditions, the light-emitting elements 57 and 61 are kept off. The signal AEXT is also applied to the AND gate 65. However, since the signal T3L is not applied to the gate 65, the light-emitting element 52 continues flashing.

At time t2, the signals SPL1 and SPL3 are disabled, as described in case (i) above. The input signal to the NOR gate 64 is disabled. The transistor 49 is turned on, and the OP amp 50 is turned off. As a result, the transistor 51 is rendered non-conductive to turn off the light-emitting element 52.

Since the signal T2L goes low, the output level of the AND gate 47 is set at "L" level. The signal AEXT is set at "H" level by the RS-FF 48.

Other circuit operations in response to the signal T2L have been described in case (i), and a detailed description thereof will be omitted.

When the signal T3L is generated by the RS-FF 74 at time t3, the AND gate 65 is enabled to supply the clock pulse CLK to the input terminal of the NOR gate 64. The voltage appearing at the output terminal of the NOR gate 64 is changed in synchronism with the clock pulses. The transistor 49 is turned on/off in response to the clock pulses. For this reason, the output voltage from the OP amp 50 is changed in synchronism with the operation of the transistor 49. The transistor 51 repeats ON/OFF operation in synchronism with the OP amp 50. Therefore, the light-emitting element 52 starts flashing again.

Since the signal AEXT is generated, the output from the inverter 68 is set at "L" level. Therefore, the output from the NAND gate 67 is set at "H" level, the transistor 66 is turned on, and the light-emitting elements 57 and 61 are kept off.

Unlike in case (i), distance measurement is performed for the central area within the photographing field of view. The subsequent operations are the same as those in case (i), and a detailed description thereof will be omitted.

Still another embodiment will be described with reference to FIG. 12 wherein infinite distance discrimination is performed for the peripheral areas within the photographing field of view. The circuit arrangement in FIG. 12 is substantially the same as that in FIG. 9 except that the control circuit for the transistor 49 is replaced with that of the transistor 66.

Figure 12:
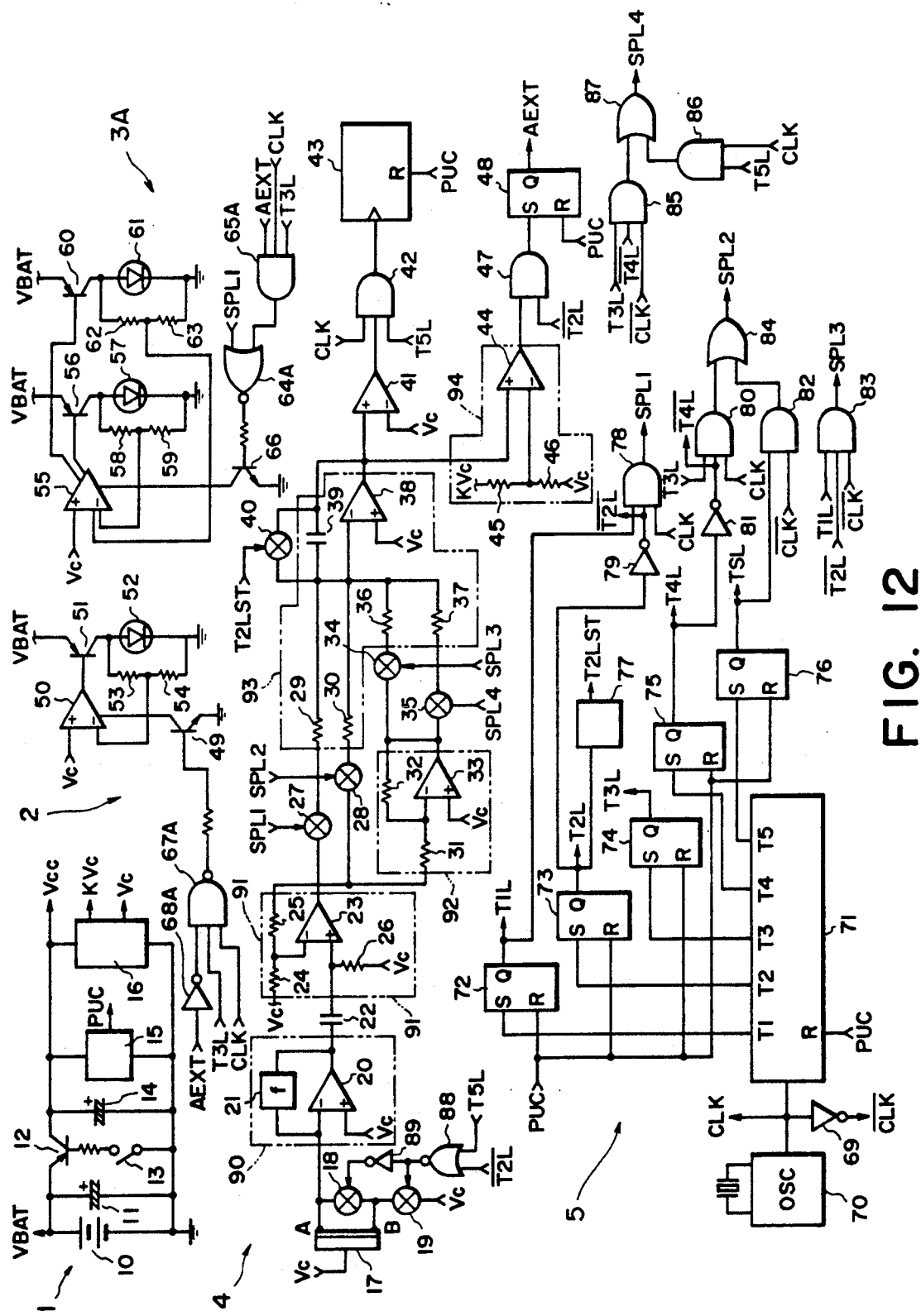
FIG. 12 is a circuit diagram showing a modification of the circuit shown in FIG. 9.

In the embodiment shown in FIG. 12, a NAND gate 67A is connected to the base of a transistor 49, and an inverter 68A is connected to an input terminal of a NAND gate 67A. A signal T3L and a clock pulse CLK, both of which are described in FIG. 9, are applied as inputs to the NAND gate 67A. A NOR gate 64A is connected to the base of a transistor 66. An output signal from an AND gate 65A and a signal SPL1 are applied as input signals to the NOR gate 64A. Signals AEXT and T3L and the clock pulse CLK, all of which are described with reference to FIG. 9, are input as input signals to the AND gate 65A.

The similar circuit arrangements of FIG. 12 to those in FIG. 9 are represented by reference numerals each with a suffix A. The components excluding the similar components are the same as those in FIG. 12, and a detailed description will be omitted.

In the embodiment shown in FIG. 12, when the user depresses the camera release button up to the first stroke, a switch 13 is closed to cause a start pulse generator 15 to generate a start pulse PUC. At the same time, reference voltages KVc and Vc are applied from a reference voltage generator 16 to the respective circuit components.

The start pulse PUC is applied to a frequency divider 71 and RS-FFs 72, 73, 74, 75, and 76, all of which are then reset. The operation for causing the frequency divider 71 to generate the signals SPL1 and SPL3 is the same as that in FIG. 9, and a detailed description thereof will be omitted.

The signal SPL1 is generated by an AND gate 78 and is applied to the NOR gate 64A in a circuit 3A. The NOR gate 64A is disabled. A voltage at the output terminal of the NOR gate 64A is set at "L" level when the signal SPL1 is set at "H" level. However, the output terminal voltage is set at "H" level when the signal SPL1 is set at "L" level. The transistor 66 starts ON/OFF operation in synchronism with the period of the signal SPL1. An OP amp 55 repeats ON/OFF operation in synchronism with the operation of the transistor 66. The transistors 56 and 60 are operated in synchronism with the OP amp 55. The light-projecting elements 57 and 61 start flashing in synchronism with the operations of the transistors 56 and 60, respectively. The infrared pulses are projected onto objects at the peripheral areas within the photographing field of view. The beams reflected by these objects are incident on a light-receiving element 17. The signals SPL1 and SPL3 are applied to the analog switches 27 and 34 in the circuit 4 upon generation of the signals SPL1 and SPL3. The analog switches 27 and 34 start ON/OFF operation according to the ON/OFF periods of the signals SPL1 and SPL3 in the same manner as in FIG. 9.

An output current from the light-receiving element 17 is converted into a voltage signal by a current-voltage converter 90. The voltage signal is supplied to non-inverting and inverting amplifiers 91 and 92. Outputs from these amplifiers are applied to an integrator 93 through the analog switches 27 and 34. The process of ascending integration of the integrator 93 for a period between times t1 and t2 is the same as that in FIG. 9.

When an ascending integration value (i.e., an output voltage v38 from the OP amp 38) for the period between times t1 and t2 does not reach a reference voltage Vr of a comparator 94 serving as a received optical signal level discriminating means, an output voltage from the AND gate 47 is kept at "L" level. An output signal AEXT is not generated by the RS-FF 48. The input signals to the AND gate 65A serving as control means for the light-receiving elements 57 and 61 are not changed. The input state for the NAND gate 67A serving as the control means for the light-emitting element 52 is not changed either. As described with reference with the embodiment of FIG. 9, when distance measurement is started upon generation of the signal T3L at time t3, the transistor 49 in a circuit 2 is turned off, and the light-emitting element 52 is driven. The transistor 66 in the circuit 3A is turned on, and the light-emitting elements 57 and 61 are kept off. The levels of the beams reflected by the objects at the peripheral areas within the photographing field of view during initial operation of the light-emitting elements 57 and 61 are discriminated to determine that the peripheral areas are areas where no distance-measurable objects are present (i.e., infinite distant areas). In this case, distance measurement is performed for the object at the central area of the photographing field of view.

When the value of ascending integration performed for the period between times t1 and t2 reaches the reference value Vr of the comparator 94, the output voltage from the OP amp 44 is inverted from "L" level to "H" level. The output voltage from the AND gate 47 is inverted from "L" level to "H" level. As a result, the signal AEXT appears at the Q output terminal of the RS-FF 48. The signal AEXT is commonly input to the AND gate 65A and the inverter 68A. When the signal T3L is applied to the AND gate 65A and the NAND gate 67A at time t3, the transistor 49 is turned on and the transistor 66 is turned off. Light-emitting elements 57B and 61 are driven, while the light-emitting element 52 is kept off.

In this case, the levels of the beams reflected from the objects in the peripheral areas within the photographing field of view during initial operation of the light-emitting elements 57 and 61 are determined to be areas where distance-measurable objects are present. In this case, distance measurement is performed for the peripheral areas.

In the embodiment of FIG. 12, infinite distance discrimination is performed first for the peripheral areas. If the peripheral areas are not determined to be infinite distant areas, distance measurement is performed then for the area determined not to be an infinite distant area.

In the embodiment of FIG. 12, only the arrangement associated with the infinite distant area discrimination is different from that in FIG. 9, and a detailed circuit operation concerning distance measurement will be omitted.

In each of the distance measuring apparatuses according to the present invention, as shown in FIGS. 9 and 12, the pair of resistors 29 and 36 having low resistances are arranged in the integrator 93 to perform ascending integration during infinite distance discrimination. At the same time, the pair of analog switches 27 and 34 are arranged to insert the resistors 29 and 36 in front of the OP amp 38. However, a circuit arrangement in FIG. 13 may be used in place of the above circuit arrangement.

Figure 13:
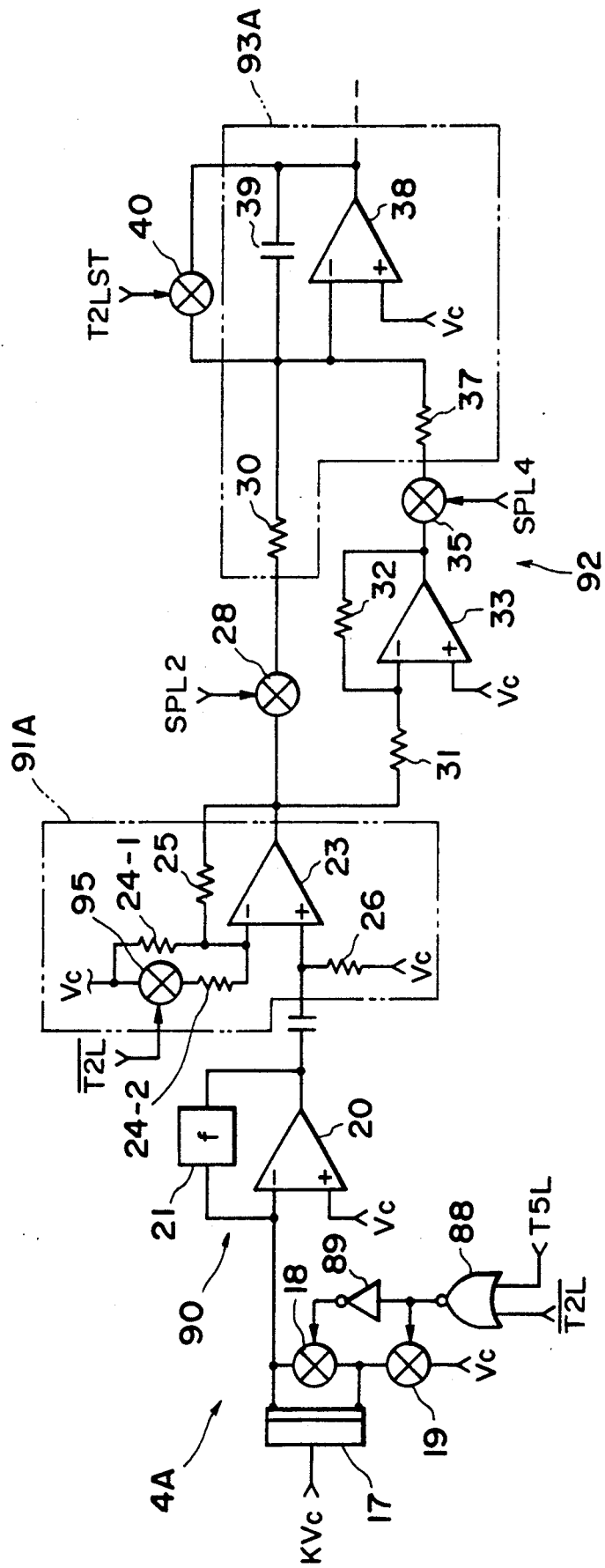
FIG. 13 is a circuit diagram showing a modification of the circuit shown in FIGS. 9 and 12.

FIG. 13 shows a modification of the circuit 4 in each of FIGS. 9 and 12. The arrangement of a noninverting amplifier 91A, the arrangement of an integrator 93A, and the number of analog switches connected to the input terminals of the integrator are different from those in the circuit 4 of FIG. 9 or 12. In a circuit 4A of FIG. 13, an output signal from a light-receiving element 17 during infinite distance discrimination is applied to the integrator 93A through only the noninverting amplifier 91A. A signal input to the noninverting amplifier 91A is amplified at an infinite distance discrimination gain larger than that during distance measurement.

The same reference numerals as in FIGS. 9 and 12 denote the same parts in FIG. 13, and a detailed description will be omitted.

In the noninverting amplifier 91A of FIG. 13, parallel resistors 24-1 and 24-2 are connected to inverting input terminals of an OP amp 23. An analog switch 95 is connected in series with the resistor 24-2. When the analog switch 95 is turned on, a resistance of the resistor connected to the inverting input terminal of the OP amp 23 is decreased. When the analog switch 95 is open, the gain is decreased. In other words, the noninverting amplifier 91A is constituted by a variable amplifier.

The analog switch 95 is connected to an RS-FF 73 (FIG. 9) such that the switch 95 is turned on in response to a signal $\overline{T2L}$. The gain of the noninverting amplifier 91A is large during the period between times t1 and t2 until the timing signal T2 is generated. Even if the output signal from the light-receiving element 17 is small, the signal can be amplified at a large gain. Therefore, the level of the output signal can be easily discriminated. The infinite distant area can be discriminated in a short period of time.

The number of resistors connected to the input terminals of the OP amplifier 38 in the integrator 93A arranged in the circuit 4A of FIG. 13 is halved as compared with that in the integrator 93 shown in FIG. 9 or 12. The resistors 29 and 34 used for infinite distance discrimination are omitted from the integrator 93 in FIG. 9 or 12. Therefore, the resistor 30 in the OP amplifier 38 in the integrator 93A is used in both infinite distance discrimination and distance measurement. Therefore, only two analog switches (i.e., analog switches 28 and 35) shown in FIG. 9 are required to connect the noninverting and inverting amplifiers to the integrator.

If the circuit 4A in FIG. 13 is employed as a received light signal processing means, the generating means for generating the signal SPL1 and SPL3 is not required. Therefore, the arrangement of the circuit 5 in the FIG. 13 can be simpler than that in FIG. 9 or 12.

According to the present invention, as described above, there is provided a distance measuring apparatus for projecting a signal and measuring a distance up to an object according to a reception position of a signal reflected by the object, the apparatus being arranged such that a ratio of a plurality of outputs from a receiver for receiving the reflected signal is changed according to the reception position of the reflected signal, the change state is detected by ascending and descending integrations of the plurality of outputs, and the reception position of the reflected signal is detected, comprising: projecting means for projecting the signal; timer means for counting a predetermined period of time within a period required for the ascending integration; detecting means for detecting whether an amplitude of the reflected signal received by the receiving means has reached a predetermined level within the predetermined period of time counted by the timer means; and switching means for causing the projecting means to project the signal onto one of central and peripheral areas within a field of view and the signal to the other one of the central and peripheral areas to measure a distance for the other one of the areas when the amplitude of the reflected signal does not reach the predetermined level within the predetermined period of time, thereby accurately measuring a distance to the object within a short period of time regardless of the position of the object and with only a compact arrangement, thus providing many practical advantages.

We claim:

1. A distance measuring apparatus for measuring a distance of an object, having a position within a measurable range in a field of view, the field of view having first and second areas, said apparatus comprising:
   projecting means for projecting an incident signal on said object within said measurable range, said incident signal being projected toward one of said first and second areas of the field of view;
   receiving means for receiving a reflected signal resulting from reflection of said incident signal off said object;
   timer means for timing a predetermined time period;
   detecting means for detecting whether said received reflected signal reached a predetermined level within said predetermined time period; and
   switching means for switching said incident signal from one of said first and second area to the other of said first and second areas, in response to said detecting means detecting that said received reflected signal did not reach said predetermined level within said predetermined period.

2. A distance measuring apparatus according to claim 1, wherein said projecting means comprises light emitting means for emitting a light signal.

3. A distance measuring apparatus according to claim 1, wherein said switching means comprises discriminating means for measuring the distance of one of said first and second areas onto which said incident signal is projected, when said detecting means detects that said received reflected signal has reached said predetermined level within said predetermined time period.

4. A distance measuring apparatus according to claim 1, further comprising amplifying means for amplifying an output of said receiving means, said detecting means detecting an output of said amplifying means; and
   varying means for varying an amplification factor of said amplifying means, said varying means setting said amplification factor in the detection operation of said detecting means to be larger than the amplification factor in the actual distance measuring operation.

5. A distance measuring apparatus according to claim 1, wherein said first area is a center area within the field of view, and said second area is a peripheral area within the field of view.

6. A distance measuring apparatus according to claim 1, further comprising:
   camera apparatus coupled to said distance measuring apparatus; and
   means for causing an operation of said distance measuring apparatus in response to an operation of the camera apparatus.

7. A distance measuring apparatus for measuring a distance of an object, having a position within a measurable range, in a field of view, the field of view having first and second areas, said apparatus comprising:

projecting means for projecting an incident signal on said object within said measurable range, said incident signal being projected toward one of said first and second areas of the field of view;

receiving means for receiving a reflected signal resulting from reflection of said incident signal off said object;

detecting means for detecting whether said received reflected signal reached a predetermined level; and switching means for causing said projection means to switch said incident signal from one of said first and second areas to the other of said first and second areas, in response to said detecting means detecting that said received reflected signal did not reach said predetermined level.

8. A distance measuring apparatus according to claim 7, wherein said projecting means comprises light emitting means for emitting a light signal.

9. A distance measuring apparatus according to claim 7, wherein said switching means comprises discriminating means for measuring distance of one of said first and second areas onto which said incident signal is projected when said detecting means detects that said received reflected signal has reached said predetermined level.

10. A distance measuring apparatus according to claim 7, wherein said first area is a center area within the field of view, and said second area is a peripheral area within the field of view.

11. A distance measuring apparatus according to claim 7, further comprising:

camera apparatus coupled to said distance measuring apparatus; and means for causing an operation of said distance measuring apparatus in response to an operation of the camera apparatus.

12. A distance measuring apparatus with a plurality of distance measuring axes for measuring the distance to an object along each of said distance measuring axes by projecting signals along said distance measuring axes and receiving reflected signals of said projected signals on each distance measuring axis, comprising:

(a) a projection means for projecting the signals;
(b) a receiving means for receiving the reflected signals;
(c) a timer means for measuring a predetermined time; and
(d) a selection means for selecting one distance measuring axis among the plurality of distance measuring axes on the basis of whether an amount of one of the reflected signals received by said receiving means reaches a predetermined level during the predetermined time measured by said timer means.

13. A distance measuring apparatus according to claim 12, wherein said projection means comprises light emitting means for emitting light signals as the projected signals.

14. A distance measuring apparatus according to claim 13, wherein said light emitting means comprises a plurality of light emitting portions for emitting light signals along each of said distance measuring axes.

15. A distance measuring apparatus according to claim 14, wherein said selection means comprises means for selecting the one distance measuring axis by selecting one light emitting portion.

16. A distance measuring apparatus according to claim 13, wherein said receiving means comprises a light position detection means for detecting a light receiving position of the reflected light signals.

17. A distance measuring apparatus according to claim 16, wherein said light position detection means provides first and second signal outputs and is constituted so that a rate of the first and second signal outputs changes in accordance with the detected light receiving position.

18. A distance measuring apparatus according to claim 17, further comprising a determining means for determining an output rate of the first and second signal outputs on the basis of an integration result or a reverse integration result of the first and second signal outputs.

19. A distance measuring apparatus according to claim 18, wherein the predetermined time measured by said timer means is set to be shorter than a time needed for determination of the integration result.

20. A distance measuring apparatus according to claim 18, wherein the predetermined time measured by said timer means is set to be equal to a time needed for determination of the integration result.

21. A distance measuring apparatus according to claim 13, wherein said receiving means comprises a light receiving means for receiving reflected light signals.

22. A distance measuring apparatus according to claim 21, further comprising an integration means for integrating or reverse integrating outputs of said light receiving means.

23. A distance measuring apparatus according to claim 22, wherein the predetermined time measured by said timer means is set to be shorter than a time needed for an integration operation of said integration means.

24. A distance measuring apparatus according to claim 22, wherein the predetermined time measured by said timer means is set to be equal to a time needed for an integration operation of said integration means.

25. A distance measuring apparatus according to claim 12, wherein said projection means includes a plurality of signal generating portions for projecting the projected signals.

26. A distance measuring apparatus according to claim 25, wherein said selection means comprises means for selecting the one distance measuring axis by selecting one of said signal generating portions.

27. A distance measuring apparatus according to claim 12, wherein said receiving means comprises a signal receiving position detection means for detecting a receiving position of the reflected signals.

28. A distance measuring apparatus according to claim 27, wherein said signal receiving position detection means provides first and second signal outputs and is constituted so that a rate of the first and second signal outputs changes in accordance with the detected signal receiving position.

29. A distance measuring apparatus according to claim 28, further comprising a determining means for determining an output rate of the first and second signal outputs on the basis of an integration result or a reverse integration result of the first and second signal outputs.

30. A distance measuring apparatus according to claim 29, wherein the predetermined time measured by said timer means is set to be shorter than a time needed for determination of the integration result.

31. A distance measuring apparatus according to claim 29, wherein the predetermined time measured by said timer means is set to be equal to a time needed for determination of the integration result.

32. A distance measuring apparatus according to claim 12, further comprising an integration means for integrating or reverse integrating outputs of said receiving means.

33. A distance measuring apparatus according to claim 32, wherein the predetermined time measured by said timer means is set to be shorter than a time needed for an integration operation of said integration means.

34. A distance measuring apparatus according to claim 32, wherein the predetermined time measured by said timer means is set to be equal to a time needed for an integration operation of said integration means.

35. A distance measuring apparatus according to claim 12, wherein said selection means comprises means for selecting one of the distance measuring axes corresponding to the signals being received by said receiving means when the amount of the reflected signal reaches a predetermined level during the predetermined time measured by said timer means.

36. A distance measuring apparatus according to claim 12, wherein said selection means selects another distance measuring axis different from the one distance measuring axis when the amount of the reflected signal does not exceed the predetermined level during the predetermined time measured by said timer means.

37. A distance measuring apparatus according to claim 12, further comprising amplifying means for amplifying outputs of said receiving means, an amplifying factor of said amplifying means being set large during said predetermined time.

38. A camera provided with a distance measuring apparatus which measures distances to objects along a plurality of distance measuring axes by projecting signals along the distance measuring axes and by receiving reflected signals of the projected signals on each of said distance measuring axes, comprising:
(a) a projection means for projecting the signals;
(b) a receiving means for receiving the reflected signals;
(c) a timer means for measuring a predetermined time; and
(d) a selection means for selecting one distance measuring axis from among the plurality of distance measuring axes on the basis of whether an amount of the reflected signal received along said one distance measuring axis by said receiving means reaches a predetermined level during the predetermined time measured by said timer means.

39. A distance measuring apparatus for measuring distances to objects along a plurality of distance measuring axes by projecting signals along the distance measuring axes and by receiving reflected signals of the projected signals on each of said distance measuring axes, comprising:
(a) a projection means for projecting the signals;
(b) a receiving means for receiving the reflected signals;
(c) a timer means for measuring a predetermined time; and
(d) a priority means for giving a priority to a distance measuring axis corresponding to a peripheral portion of a field of view of said apparatus when a signal amount of a reflected signal received along a distance measuring device corresponding to substantially a center of the field of view does not reach a predetermined amount during the predetermined time measured by said timer means.

40. A distance measuring apparatus for measuring distances to objects along a plurality of distance measuring axes by projecting signals along the distance measuring axes and by receiving reflected signals of the projected signals on each of said distance measuring axes, comprising:
(a) a projection means for projecting the signals;
(b) a receiving means for receiving the reflected signals;
(c) a timer means for measuring a predetermined time; and
(d) a priority means for giving a priority to a distance measuring axis corresponding to substantially a center portion of a field of view of said apparatus when a signal amount of a reflected signal received along a distance measuring axis corresponding to the center of the field of view reaches a predetermined amount during the predetermined time measured by said timer means.

41. A distance measuring apparatus for measuring distances to objects along a plurality of distance measuring axes by projecting signals along the distance measuring axes and by receiving reflected signals of the projected signals on each of said distance measuring axes, comprising:
(a) a projection means for projecting the signals;
(b) a receiving means for receiving the reflected signals;
(c) a timer means for measuring a predetermined time; and
(d) a priority means for giving a priority to a distance measuring axis corresponding to substantially a center portion of a field of view of said apparatus when a signal amount of a reflected signal received along a distance measuring axis corresponding to a peripheral portion of the field of view does not reach a predetermined amount during the predetermined time measured by said timer means.

42. A distance measuring apparatus for measuring distances to objects along a plurality of distance measuring axes by projecting signals along the distance measuring axes and by receiving reflected signals of the projected signals on each of said distance measuring axes, comprising:
(a) a projection means for projecting the signals;
(b) a receiving means for receiving the reflected signals;
(c) a timer means for measuring a predetermined time; and
(d) a priority means for giving a priority to a distance measuring axis corresponding to a peripheral portion of a field of view of said apparatus when a signal amount of a reflected signal received along a distance measuring axis corresponding to the peripheral portion of the field of view reaches a predetermined amount during the predetermined time measured by said timer means.

43. A distance measuring apparatus for measuring distances to objects along a plurality of distance measuring axes by projecting signals along the distance measuring axes and by receiving reflected signals of the projected signals on each of said distance measuring axes, comprising:
(a) a projection means for projecting the signals;

(b) a receiving means for receiving the reflected signals;
(c) an integration means for integrating or reverse integrating outputs of said receiving means; and
(d) a selection means for selecting one of the distance measuring axes in response to whether an integrated or reverse integrated value reaches a predetermined value.

44. A camera provided with a distance measuring apparatus which measures distances to objects along a plurality of distance measuring axes by projecting signals along the distance measuring axes and by receiving reflected signals of the projected signals on each of said distance measuring axes, comprising:
(a) a projection means for projecting the signals;
(b) a receiving means for receiving the reflected signals;
(c) an integration means for integrating or reverse integrating outputs of said receiving means; and
(d) a selection means for selecting one of the distance measuring axes in response to whether an integrated or reverse integration value reaches a predetermined value.

45. A distance measuring apparatus for measuring distances to objects along a plurality of distance measuring axes by projecting signals along the distance measuring axes and by receiving reflected signals of the projected signals on each of said distance measuring axes, comprising:
(a) a projection means for projecting the signals;
(b) a receiving means for receiving the reflected signals;
(c) an integration means for integrating or reverse integrating an output of said receiving means; and
(d) a priority means for giving a priority to a distance measuring axis corresponding to a peripheral portion of a field of view of said apparatus when an integration or reverse integration value corresponding to a reflected signal received from a distance measuring axis corresponding to substantially a center of the field of view does not reach a predetermined level.

46. A distance measuring apparatus for measuring distances to objects along a plurality of distance measuring axes by projecting signals along the distance measuring axes and by receiving reflected signals of the projected signals on each of said distance measuring axes, comprising:
(a) a projection means for projecting the signals;
(b) a receiving means for receiving the reflected signals;
(c) an integration means for integrating or reverse integrating outputs of said receiving means; and
(d) a priority means for giving a priority to a distance measuring axis corresponding to substantially a center portion of a field of view of said apparatus when an integration or reverse integration value corresponding to a reflected signal received from the distance measuring axis corresponding to a peripheral portion of the field of view does not reach a predetermined level.

47. A distance measuring apparatus for measuring distances to objects along a plurality of distance measuring axes by projecting signals along the distance measuring axes and by receiving reflected signals of the projected signals on each of said distance measuring axes, comprising:
(a) a projection means for projecting the signals;
(b) a receiving means for receiving the reflected signals;
(c) an integration means for integrating or reverse integrating outputs of said receiving means; and
(d) a priority means for giving a priority to a distance measuring axis corresponding to a peripheral portion of a field of view of said apparatus when an integration or reverse integration value corresponding to a reflected signal received from the distance measuring axis corresponding to the peripheral portion of the field of view reaches a predetermined level.

48. A distance measuring apparatus with a plurality of distance measuring axes for measuring the distance to an object along each of said distance measuring axes by projecting light along said distance measuring axes and receiving reflected light of said projected light on each distance measuring axis, comprising:
(a) a projection means for projecting the light;
(b) a receiving means for receiving the reflected light;
(c) a timer means for measuring a predetermined time; and
(d) a selection means for selecting one distance measuring axis among the plurality of distance measuring axes on the basis of whether an amount of one of the reflected light received by said receiving means reaches a predetermined level during the predetermined time measured by said timer means.

49. A camera provided with a distance measuring apparatus which measures distances to objects along a plurality of distance measuring axes by projecting light along the distance measuring axes and by receiving reflected light of the projected light on each of said distance measuring axes, comprising:
(a) a projection means for projecting the signals;
(b) a receiving means for receiving the reflected light;
(c) a timer means for measuring a predetermined time; and
(d) a selection means for selecting one distance measuring axis from among the plurality of distance measuring axes on the basis of whether an amount of the reflected light received along said one distance measuring axis by said receiving means reaches a predetermined level during the predetermined time measured by said timer means.

50. A distance measuring apparatus for measuring distances to objects along a plurality of distance measuring axes by projecting light along the distance measuring axes and by receiving reflected light of the projected light on each of said distance measuring axes, comprising:
(a) a projection means for projecting the light;
(b) a receiving means for receiving the reflected light;
(c) a timer means for measuring a predetermined time; and
(d) a priority means for giving a priority to a distance measuring axis corresponding to a peripheral portion of a field of view of said apparatus when a light amount of a reflected light received a long a distance measuring axis corresponding to substantially a center of the field of view does not reach a predetermined amount during the predetermined time measured by said timer means.

51. A distance measuring apparatus for measuring distances to objects along a plurality of distance measuring axes by projecting light along the distance measuring axes and by receiving reflected light of the projected light on each of said distance measuring axes, comprising:
- (a) a projection means for projecting the light;
- (b) a receiving means for receiving the reflected light;
- (c) a timer means for measuring a predetermined time; and
- (d) a priority means for giving a priority to a distance measuring axis corresponding to substantially a center portion of a field of view of said apparatus when a light amount of a reflected light received along a distance measuring axis corresponding to the center of the field of view reaches a predetermined amount during the predetermined time measured by said timer means.

52. A distance measuring apparatus for measuring distances to objects along a plurality of distance measuring axes by projecting light along the distance measuring axes and by receiving reflected light of the projected light on each of said distance measuring axes, comprising:
- (a) a projection means for projecting the light;
- (b) a receiving means for receiving the reflected light;
- (c) a timer means for measuring a predetermined time; and
- (d) a priority means for giving a priority to a distance measuring axis corresponding to substantially a center portion of a field of view of said apparatus when a light amount of a reflected light received along a distance measuring axis corresponding to a peripheral portion of the field of view does not reach a predetermined amount during the predetermined time measured by said timer means.

53. A distance measuring apparatus for measuring distances to objects along a plurality of distance measuring axes by projecting light along the distance measuring axes and by receiving reflected light of the projected light on each of said distance measuring axes, comprising:
- (a) a projection means for projecting the light;
- (b) a receiving means for receiving the reflected light;
- (c) a timer means for measuring a predetermined time; and
- (d) a priority means for giving a priority to a distance measuring axis corresponding to a peripheral portion of a field of view of said apparatus when a light amount of a reflected light received along a distance measuring axis corresponding to the peripheral portion of the field of view reaches a predetermined amount during the predetermined time measured by said timer means.

54. A distance measuring apparatus for measuring distances to objects along a plurality of distance measuring axes by projecting light along the distance measuring axes and by receiving reflected light of the projected light on each of said distance measuring axes, comprising:
- (a) a projection means for projecting the light;
- (b) a receiving means for receiving the reflected light;
- (c) an integration means for integrating or reverse integrating outputs of said receiving means; and
- (d) a selection means for selecting one of the distance measuring axes in response to whether an integrated or reverse integrated value reaches a predetermined value.

55. A camera provided with a distance measuring apparatus which measures distances to objects along a plurality of distance measuring axes by projecting light along the distance measuring axes and by receiving reflected light of the projected light one each of said distance measuring axes, comprising:
- (a) a projection means for projecting the light;
- (b) a receiving means for receiving the reflected light;
- (c) an integration means for integrating or reverse integrating outputs of said receiving means; and
- (d) a selection means for selecting one of the distance measuring axes in response to whether an integrated or reverse integration value reaches a predetermined value.

56. A distance measuring apparatus for measuring distances to objects along a plurality of distance measuring axes by projecting light along the distance measuring axes and by receiving reflected light of the projected light on each of said distance measuring axes, comprising:
- (a) a projection means for projecting the light;
- (b) a receiving means for receiving the reflected light;
- (c) an integration means for integrating or reverse integrating outputs of said receiving means; and
- (d) a priority means for giving a priority to a distance measuring axis corresponding to a peripheral portion of a field of view of said apparatus when an integration or reverse integration value corresponding to a reflected light received from a distance measuring axis corresponding to substantially a center of the field of view does not reach a predetermined level.

57. A distance measuring apparatus for measuring distances to objects along a plurality of distance measuring axes by projecting light along the distance measuring axes and by receiving reflected light of the projected light on each of said distance measuring axes, comprising:
- (a) a projection means for projecting the light;
- (b) a receiving means for receiving the reflected light;
- (c) an integration means for integrating or reverse integrating outputs of said receiving means; and
- (d) a priority means for giving a priority to a distance measuring axis corresponding to substantially a center portion of a field of view of said apparatus when an integration or reverse integration value corresponding to a reflected light received from the distance measuring axis corresponding to a peripheral portion of the field of view does not reach a predetermined level.

58. A distance measuring apparatus for measuring distances to objects along a plurality of distance measuring axes by projecting light along the distance measuring axes by projecting light along the distance measuring axes and by receiving reflected light of the projected light on each of said distance measuring axes, comprising:
- (a) a projection means for projecting the light;
- (b) a receiving means for receiving the reflected light;
- (c) an integration means for integrating or reverse integrating outputs of said receiving means; and
- (d) a priority means for giving a priority to a distance measuring axis corresponding to a peripheral portion of a field of view of said apparatus when an integration of reverse integration value corresponding to a reflected light received from the distance measuring axis corresponding to the peripheral portion of the field of view reaches a predetermined level.

59. A distance measuring apparatus for measuring distances to objects along a plurality of distance measuring axes by projecting light along the distance measuring axes and by receiving reflected light of the projected light on each of said distance measuring axes, comprising:
(a) a projection means for projecting the light;
(b) a receiving means for receiving the reflected light;
(c) an integration means for integrating or reverse integrating outputs of said receiving means; and
(d) priority means for giving a priority to a distance measuring axis corresponding to substantially a center portion of a field of view of said apparatus when an integration or reverse integration value corresponding to a reflected light received from the distance measuring axis corresponding to substantially the center of the field of view reaches a predetermined level.

60. A distance measuring apparatus for measuring distances to objects along a plurality of distance measuring axes by projecting light along the distance measuring axes and by receiving reflected light of the projected signals on each of said distance measuring axes, comprising:
(a) a projection means for projecting the light;
(b) a receiving means for receiving the reflected light;
(c) an integration means for integrating or reverse integrating outputs of said receiving means; and
(d) priority means for giving a priority to a distance measuring axis corresponding to substantially a center portion of a field of view of said apparatus when an integration or reverse integration value corresponding to a reflected signal received from the distance measuring axis corresponding to substantially the center of the field of view reaches a predetermined level.

* * * * *

UNITED STATES PATENT AND TRADEMARK OFFICE
CERTIFICATE OF CORRECTION

PATENT NO. : 5,087,119

DATED : February 11, 1992

INVENTOR(S) : Yoshiyuki Kaneko et al.

It is certified that error appears in the above-identified patent and that said Letters Patent is hereby corrected as shown below:

On the title page: Item

[63] Related U.S. Application Data

Line 2, change "continuation-in-part" to --continuation--.

COLUMN 1

Line 5, change "was" to --is--.
Line 7, change "Feb. 27, 1989," to --Feb. 27, 1987,--.
Line 21, change "incorporate" to --have incorporated--.

COLUMN 3

Line 54, change "called" to --referred to--.

COLUMN 4

Line 45, change "constitutes" to --constitute--.

COLUMN 7

Line 3, change "$T_{A+B} = \{A/(A+B)T_A$" to --$T_{A+B} = \{A/(A+B)\}T_A$--.

UNITED STATES PATENT AND TRADEMARK OFFICE
CERTIFICATE OF CORRECTION

PATENT NO. : 5,087,119

DATED : February 11, 1992

INVENTOR(S) : Yoshiyuki Kaneko et al.

It is certified that error appears in the above-identified patent and that said Letters Patent is hereby corrected as shown below:

COLUMN 8

Line 2, change "R1" to --R1,--.
Line 8, change "voltage" to --voltages--.
Line 10, "ers" should read --er--.
Line 55, change "shorten" to --shortens--.

COLUMN 9

Line 66, delete "for controlling".

COLUMN 10

Line 60, change "element" to --elements--.
Line 68, change "to" to --, T2, T3, T4, and--.

COLUMN 12

Line 18, change "(Note" to --(note--.
Line 40, change "a" to --and a--.

COLUMN 18

Line 31, change "and 55" to --amp 55--.

COLUMN 22

Line 33, change "area" to --areas--.

COLUMN 25

Line 68, change "device" to --axis--.

UNITED STATES PATENT AND TRADEMARK OFFICE
CERTIFICATE OF CORRECTION

PATENT NO. : 5,087,119

DATED : February 11, 1992

INVENTOR(S) : Yoshiyuki Kaneko et al.

It is certified that error appears in the above-identified patent and that said Letters Patent is hereby corrected as shown below:

COLUMN 28

Line 26, change "light" to --lights--.
    Line 36, change "signals;" to --light--.
    Line 60, change "a long" to --along--.

COLUMN 30

Line 1, change "one" to --on--.
    Line 50, delete "by projecting light along the distance measur-".
    Line 51, delete "ing axes".

COLUMN 32

Line 1, change "light" to --signals--.
    Line 2, change "light" to --signals--.
    Line 5, change "light;" to --signals;--.
    Line 6, change "light;" to --signals;--

Signed and Sealed this

Fourteenth Day of September, 1993

Attest:

BRUCE LEHMAN

Attesting Officer     Commissioner of Patents and Trademarks